(12) United States Patent
Chaudry et al.

(10) Patent No.: US 11,666,178 B2
(45) Date of Patent: *Jun. 6, 2023

(54) GREASE STRAINER FOR COOKING APPARATUS

(71) Applicant: CHAUDWAY ENTERPRISES LLC, Powell, OH (US)

(72) Inventors: Adam Chaudry, Powell, OH (US); Josh Conway, Powell, OH (US); Joseph Lehman, New Albany, OH (US); Sean D. Montag, Westerville, OH (US)

(*) Notice: Subject to any disclaimer, the term of this patent is extended or adjusted under 35 U.S.C. 154(b) by 361 days.

This patent is subject to a terminal disclaimer.

(21) Appl. No.: 16/814,877

(22) Filed: Mar. 10, 2020

(65) Prior Publication Data
US 2020/0305644 A1    Oct. 1, 2020

Related U.S. Application Data

(62) Division of application No. 14/949,192, filed on Nov. 23, 2015, now Pat. No. 10,582,804.

(60) Provisional application No. 62/208,104, filed on Aug. 21, 2015, provisional application No. 62/183,001, filed on Jun. 22, 2015.

(51) Int. Cl.
  *A47J 37/10*    (2006.01)
(52) U.S. Cl.
  CPC .................................. *A47J 37/108* (2013.01)
(58) Field of Classification Search
  CPC ........... A47J 37/108; A47J 36/00; A47J 36/08

USPC .......... 99/324, 340, 359, 373, 375, 391, 444
See application file for complete search history.

(56) References Cited

U.S. PATENT DOCUMENTS

| | | | | |
|---|---|---|---|---|
| 964,815 | A | * | 7/1910 | Rotondo ................. A47J 36/08 210/469 |
| 1,023,645 | A | * | 4/1912 | Hamilton ............ A47J 37/1295 99/410 |
| 1,053,780 | A | * | 2/1913 | Brooks .................... A47J 36/08 210/469 |
| 1,225,047 | A | * | 5/1917 | Milligan ................. A47J 36/08 210/469 |
| 1,402,170 | A | * | 1/1922 | Manery ................... A47J 36/08 210/465 |
| 1,578,466 | A | * | 3/1926 | Pearl ....................... A47J 36/08 210/245 |
| 1,624,745 | A | * | 4/1927 | Kuhnast .................. A47J 36/08 210/465 |
| 1,636,240 | A | * | 7/1927 | Partridge ................ A47J 36/08 210/465 |
| 1,664,564 | A | * | 4/1928 | Lipner .................... A47J 36/08 210/238 |
| 1,750,158 | A | * | 3/1930 | Blakeman ............... A47J 36/08 210/465 |
| 1,916,710 | A | * | 7/1933 | Alexander .............. A47J 36/08 210/469 |
| 1,928,851 | A | * | 10/1933 | Devlin .................... A47J 36/08 210/469 |
| 1,994,576 | A | * | 3/1935 | Dean ....................... A47J 36/08 222/189.07 |

(Continued)

*Primary Examiner* — Jimmy Chou
(74) *Attorney, Agent, or Firm* — Bryce D. Miracle, Esq.

(57) ABSTRACT

A pivoting strainer attachable to a cooking apparatus. The pivoting strainer provides a unique, safe way to drain grease while cooking and is operated by the use of a single hand. The pivoting strainer moveable between a closed position and a raised, draining position.

12 Claims, 21 Drawing Sheets

(56) References Cited

U.S. PATENT DOCUMENTS

| | | | | |
|---|---|---|---|---|
| 1,997,509 | A * | 4/1935 | Betteridge | A47J 36/08 210/245 |
| 2,118,530 | A * | 5/1938 | Smith | A47J 36/08 210/245 |
| 2,133,724 | A * | 10/1938 | Smulski | A47J 36/08 210/469 |
| 2,240,454 | A * | 4/1941 | Badaracco | A47J 36/08 222/189.07 |
| 2,284,342 | A * | 5/1942 | Quinby | A47J 36/08 210/465 |
| 2,397,176 | A * | 3/1946 | Whiting | A47J 36/08 210/466 |
| 2,398,978 | A * | 4/1946 | Udell | A47J 36/08 210/469 |
| 2,400,642 | A * | 5/1946 | Hassel | A47J 36/08 210/469 |
| 2,463,209 | A * | 3/1949 | Serkes | A47J 36/08 210/469 |
| 2,466,347 | A * | 4/1949 | Ziemianin | A47J 36/08 210/465 |
| 2,499,016 | A * | 2/1950 | Buckley | A47J 36/08 210/469 |
| 2,511,111 | A * | 6/1950 | Jakubowski | A47J 36/08 210/466 |
| 2,520,382 | A * | 8/1950 | Conrad | A47J 36/08 210/465 |
| 2,808,938 | A * | 10/1957 | Glover | A47J 36/08 210/469 |
| 3,240,348 | A * | 3/1966 | Serio | A47J 36/08 210/469 |
| 3,289,849 | A * | 12/1966 | Livingston | A47J 36/08 210/469 |
| 4,153,045 | A * | 5/1979 | Phelon | A47J 37/101 126/381.1 |
| 4,310,418 | A * | 1/1982 | Busbey | A47J 36/08 210/467 |
| 4,626,352 | A * | 12/1986 | Massey | A47J 36/08 99/413 |
| 5,035,800 | A * | 7/1991 | Kopach | B01D 29/27 210/469 |
| 5,178,761 | A * | 1/1993 | Mohun | A47J 36/08 126/369 |
| 5,615,607 | A * | 4/1997 | Delaquis | A47J 36/08 99/409 |
| 5,653,881 | A * | 8/1997 | Bruss | A47J 36/08 210/464 |
| 5,706,721 | A * | 1/1998 | Homes | A47J 36/08 100/110 |
| 5,730,045 | A * | 3/1998 | Delaquis | A47J 36/08 99/337 |
| 6,520,383 | B1 * | 2/2003 | Brest | A47J 36/06 210/467 |
| 6,568,314 | B1 * | 5/2003 | Stepanova | A47J 36/08 210/464 |
| 6,789,683 | B1 * | 9/2004 | Fisher | A47J 36/08 210/465 |
| 7,172,705 | B2 * | 2/2007 | Cooper | B01D 19/02 99/496 |
| 7,451,897 | B2 * | 11/2008 | PaPasodero | A47J 36/14 210/466 |
| 7,878,110 | B1 * | 2/2011 | Michnik | A47J 36/08 99/410 |
| D664,004 | S * | 7/2012 | Benishai | D7/543 |
| 8,900,451 | B2 * | 12/2014 | Cooper | A47J 43/285 99/496 |
| D824,735 | S * | 8/2018 | Chaudry | D7/668 |
| D869,914 | S * | 12/2019 | Farkas | D7/667 |
| 10,512,355 | B2 * | 12/2019 | Davison | A47J 19/00 |
| 10,582,804 | B2 * | 3/2020 | Chaudry | A47J 37/108 |
| 2003/0192823 | A1 * | 10/2003 | Marriott | A47J 36/08 210/470 |
| 2003/0192824 | A1 * | 10/2003 | Marriott | A47J 36/08 210/470 |
| 2004/0216620 | A1 * | 11/2004 | Quiggins | A47J 36/08 99/413 |
| 2004/0250690 | A1 * | 12/2004 | Restis | A47J 36/08 99/403 |
| 2005/0205487 | A1 * | 9/2005 | Rogers | A47J 36/08 210/464 |
| 2006/0070944 | A1 * | 4/2006 | Ahn | A47J 36/22 210/473 |
| 2006/0243141 | A1 * | 11/2006 | Mayer | A47J 27/04 99/495 |
| 2007/0227965 | A1 * | 10/2007 | Simard | A47J 43/284 210/469 |
| 2008/0196599 | A1 * | 8/2008 | Bhagat | A47J 36/08 99/444 |
| 2008/0308489 | A1 * | 12/2008 | Coudurier | A47J 36/08 210/469 |
| 2011/0272339 | A1 * | 11/2011 | Greiner | A47J 36/08 210/232 |
| 2012/0174798 | A1 * | 7/2012 | Kulikowski | A47J 43/22 99/340 |
| 2013/0025469 | A1 * | 1/2013 | Cloutier | A47J 37/101 99/352 |
| 2013/0074702 | A1 * | 3/2013 | Difante | A47J 27/10 99/403 |
| 2013/0139707 | A1 * | 6/2013 | Walling, III | A47J 36/22 99/444 |
| 2014/0042106 | A1 * | 2/2014 | Davison | A47J 19/00 210/767 |
| 2014/0353316 | A1 * | 12/2014 | Lin | A47J 36/08 220/573.1 |
| 2015/0313410 | A1 * | 11/2015 | Booker | A47J 37/108 99/446 |
| 2016/0367079 | A1 * | 12/2016 | Chaudry | A47J 37/108 |
| 2017/0303743 | A1 * | 10/2017 | Chaudry | A47J 36/00 |
| 2019/0216263 | A1 * | 7/2019 | Kelly | A47J 37/108 |
| 2020/0337500 | A1 * | 10/2020 | Montgomery | A47J 37/108 |

* cited by examiner

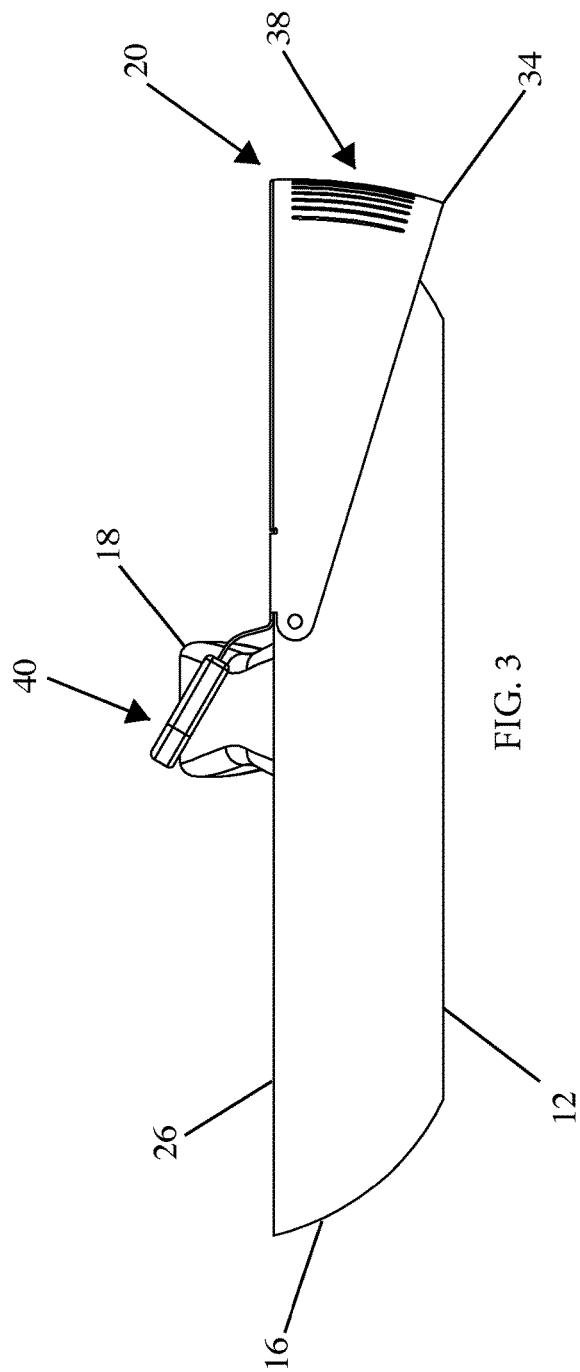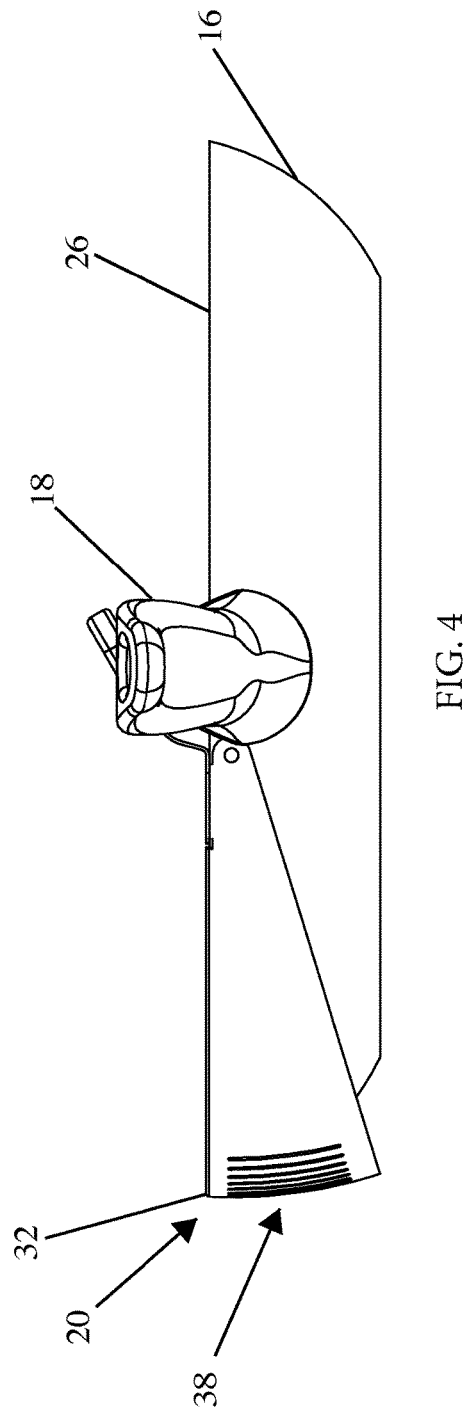

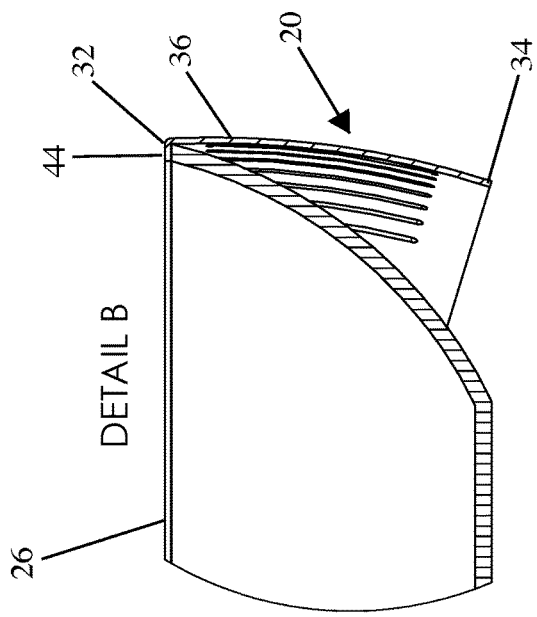
FIG. 7
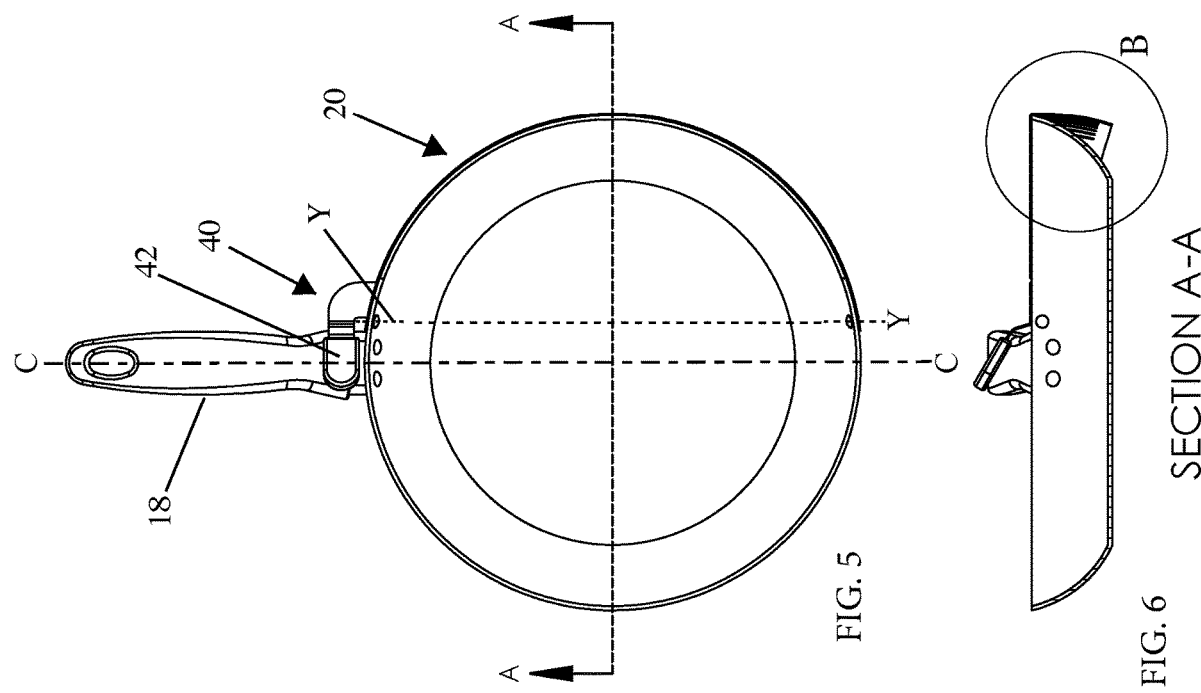
FIG. 5
FIG. 6

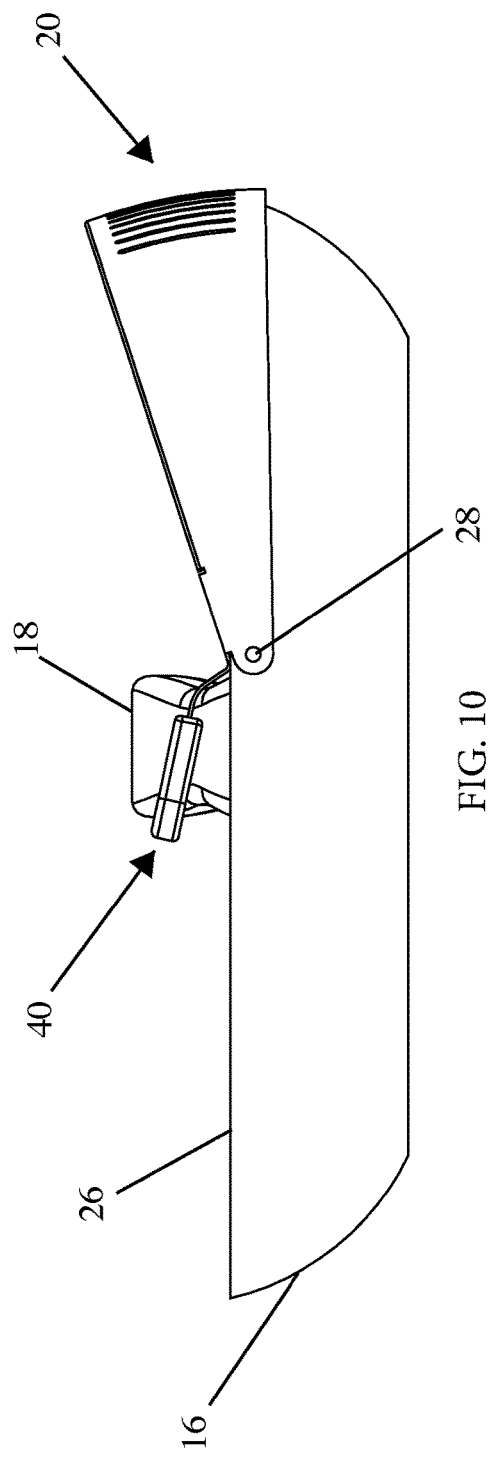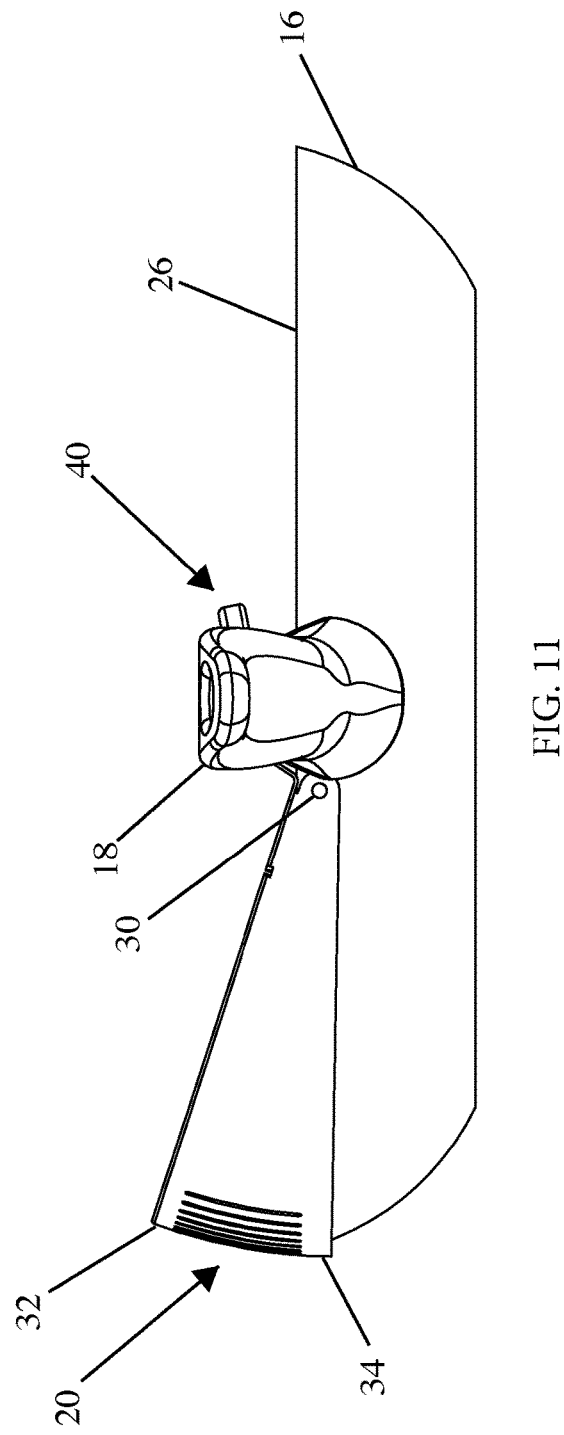
FIG. 10
FIG. 11

GREASE STRAINER FOR COOKING APPARATUS

This application is a divisional and claims the benefit of copending U.S. patent application entitled "Cooking Apparatus with Grease Strainer" filed Nov. 23, 2015 having Ser. No. 14/949,192.

BACKGROUND

The present invention relates grease strainer attachable to a cooking pot or pan that does not compromise the cooking surface and containment of food therein.

Cooking pans are well known in the culinary utensil art. A cooking pan may also be known as a frying pan, frypan, or a skillet. Cooking pans are generally a flat-bottomed pan used for frying, searing, and browning foods. The typical cooking pan is 8 to 12 inches in diameter with relatively low sides that flare outwards, a long handle, and no lid. Larger pans may have a small grab handle opposite the main handle. Traditionally, frying pans were made of cast iron. Although cast iron is still popular today, especially for outdoor cooking, most frying pans are now made from metals such as aluminum or stainless steel.

Cooking pans typically are relatively satisfactory for their intended purposes. However, on the other hand, the conventional cooking pan lacks special features that may increase the efficiency and ease of use of preparing food in a pan.

When it comes to attempting to drain a pan of grease or other liquid while keeping the solid food within, it can be quite the challenge for even a seasoned professional chef. Grease and other liquids are generally very hot and must be handled with extreme care. Not only is it difficult to ascertain the proper angle at which the pan must be tilted in order to commence the liquid drainage, but the angle must be slowly increased to maintain liquid flow. Accordingly, both chefs and amateur cooks tend to use a supporting culinary utensil, such as a pan cover or a large spoon or fork, to assist in draining the excess liquid by attempting to retain the solid food within the pan while allowing the liquid to drain over out of the pan. This process can prove to be awkward and if not done properly, hot liquids can spill or splash onto the handler, causing severe burns.

For the foregoing reason, there is a need for a grease strainer adaptable to cooking pans that will provide an efficient cooking surface as well as provide a safe and reliable manner of disposing of hot liquids contained therein.

SUMMARY

In accordance with the invention, a pivoting strainer is provided which is operably attachable to a plurality of cooking apparatuses or food containers. The pivoting strainer while attached to the cooking apparatus, such as a pan, is moveable between a lowered, closed position and a raised, draining position which is ideal for preventing burns and other injuries relating to draining the food contents of the cooking apparatus. This provides a safe, ergonomic, and efficient cooking apparatus.

The pivoting strainer is configured to operably attach to a container for straining grease and other liquid components away from solid food which can be operated by the use of a single hand. Generally, the pivoting strainer ideally cooperates with a container, cooking apparatus, or pan having a cooking surface, a peripheral wall upstanding from the base terminating with an upper curved rim, and a handle extending outwardly from the peripheral wall.

In a certain version of the application, the pivoting strainer generally comprises: a pivoting strainer defining perforations pivotally attachable to the peripheral wall of the pan and moveable about a pivot axis relative to the peripheral wall and upper curved rim between i) a draining position wherein the pivoting strainer is positioned exterior of the peripheral wall and external of the container holding food and extends above the peripheral wall and external of the container for holding food and upper curved rim exposing the perforations to the interior contents of the cooking pan, thereby enabling the passage of liquid from the interior of the pan to the exterior of the pan; and ii) a closed position wherein the pivoting strainer is positioned exterior of the peripheral wall such that it does not interfere with the cooking surfaces, the pivoting strainer pivot axis operably positioned away from the handle by an opening lever. The opening lever is operably attached to the pivoting strainer which is rotatable about the pivot axis and extends above the handle, wherein as the lever is pushed down at an engagement surface above the handle, the pivoting strainer pivots about the pivot axis moving the pivoting strainer upward from the closed position to the draining position.

In a version of the application, the drainage perforations are configured and dimensioned to block the passage of solid food therethrough. Preferably, the drainage perforations are a plurality of aligned elongated slits extending upward within the pivoting strainer.

In other versions of the application, the pivoting strainer further comprises a lower terminating perimeter which is concentric to the upper curved rim of the cooking pan, wherein while in draining position the lower terminating perimeter couples with the upper curved rim by an interference type fit, thereby preventing the pivoting strainer from moving upward and providing a seal between the pan and the pivoting strainer during the straining process.

In yet another embodiment, the pivoting strainer further comprises an upper perimeter terminating at a lip which is concentric to the upper curved rim of the cooking pan, wherein while in the closed position the lip overlaps the upper curved rim, thereby preventing the pivoting strainer from moving downward and providing a seal between the pan and the pivoting strainer.

These and other features of the present invention will become readily apparent upon further review of the following specification and drawings.

DESCRIPTION OF THE DRAWINGS

These and other features, aspects, and advantages of the present invention will become better understood with regard to the following description and accompanying figures where:

FIG. 3 is a side elevation view of the version shown in FIG. 1;

FIG. 4 is handle side elevation view of the version shown in FIG. 1;

FIG. 5 is a top plan of the version shown in FIG. 1;

FIG. 6 is a cross sectional view taken along lines A-A of FIG. 5;

FIG. 7 is an up-close detailed view of the pivoting strainer taken at B of FIG. 6;

FIG. 10 is a side elevation view of the version shown in FIG. 1 showing the pivoting strainer in the draining position;

FIG. 11 is a handle side elevation view of the version shown in FIG. 1 showing the pivoting strainer in the draining position;

DETAILED DESCRIPTION

Referring now to the figures wherein the showings are for purposes of illustrating a preferred version of the invention only and not for purposes of limiting the same, the present invention is a pivoting strainer attachable to a food container, cooking apparatus or pan which provides a unique, safe way to drain grease contained within the pan while cooking.

The following detailed description is of the best currently contemplated modes of carrying out exemplary versions of the invention. The description is not to be taken in the limiting sense, but is made merely for the purpose of illustrating the general principles of the invention, since the scope of the invention is best defined by the appended claims.

Various inventive features are described below that can each be used independently of one another or in combination with other features.

Figure 1:
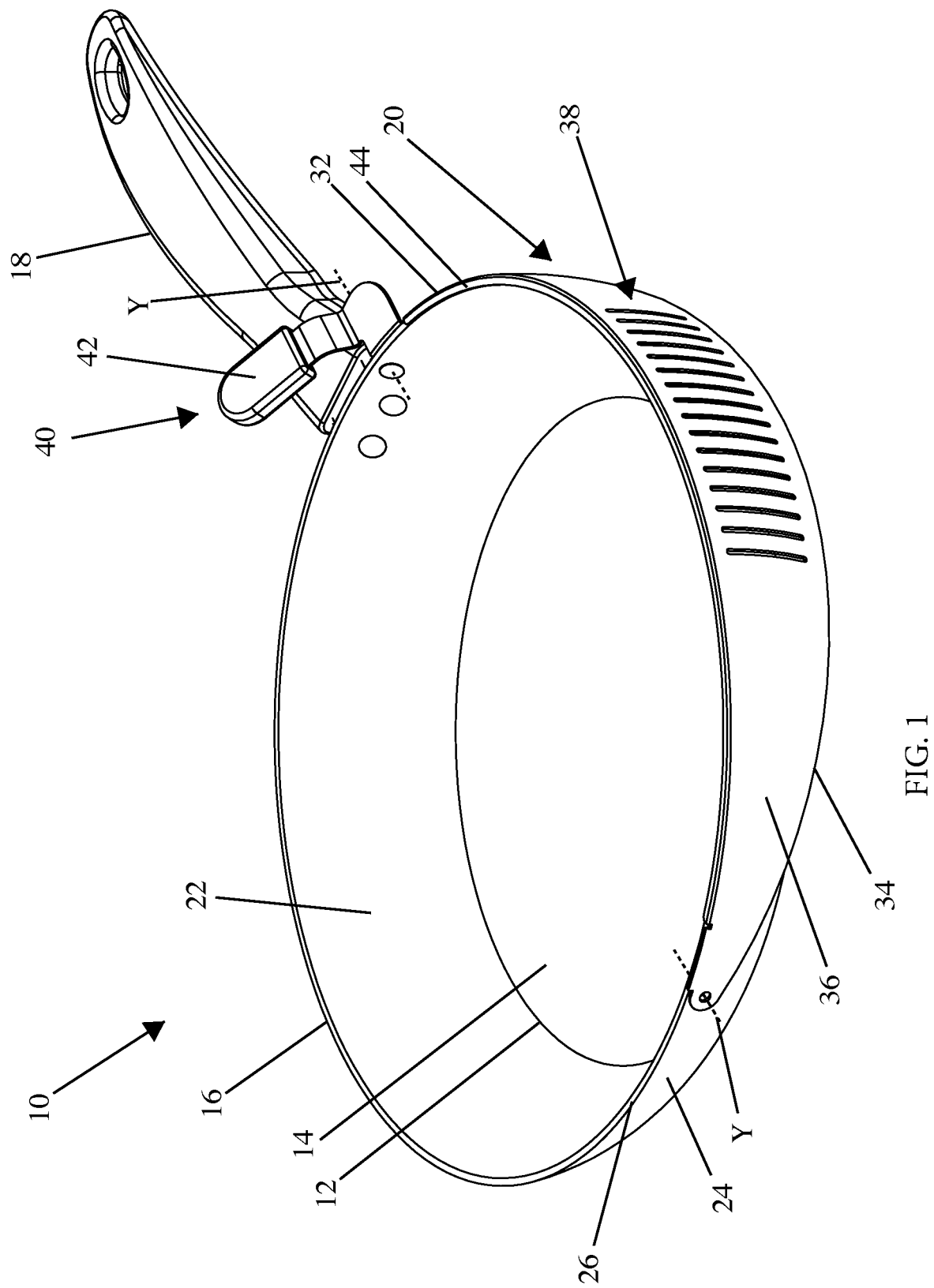
FIG. 1 is front, side perspective view of a first version of the invention showing the pivoting strainer in the closed position.
Figure 2:
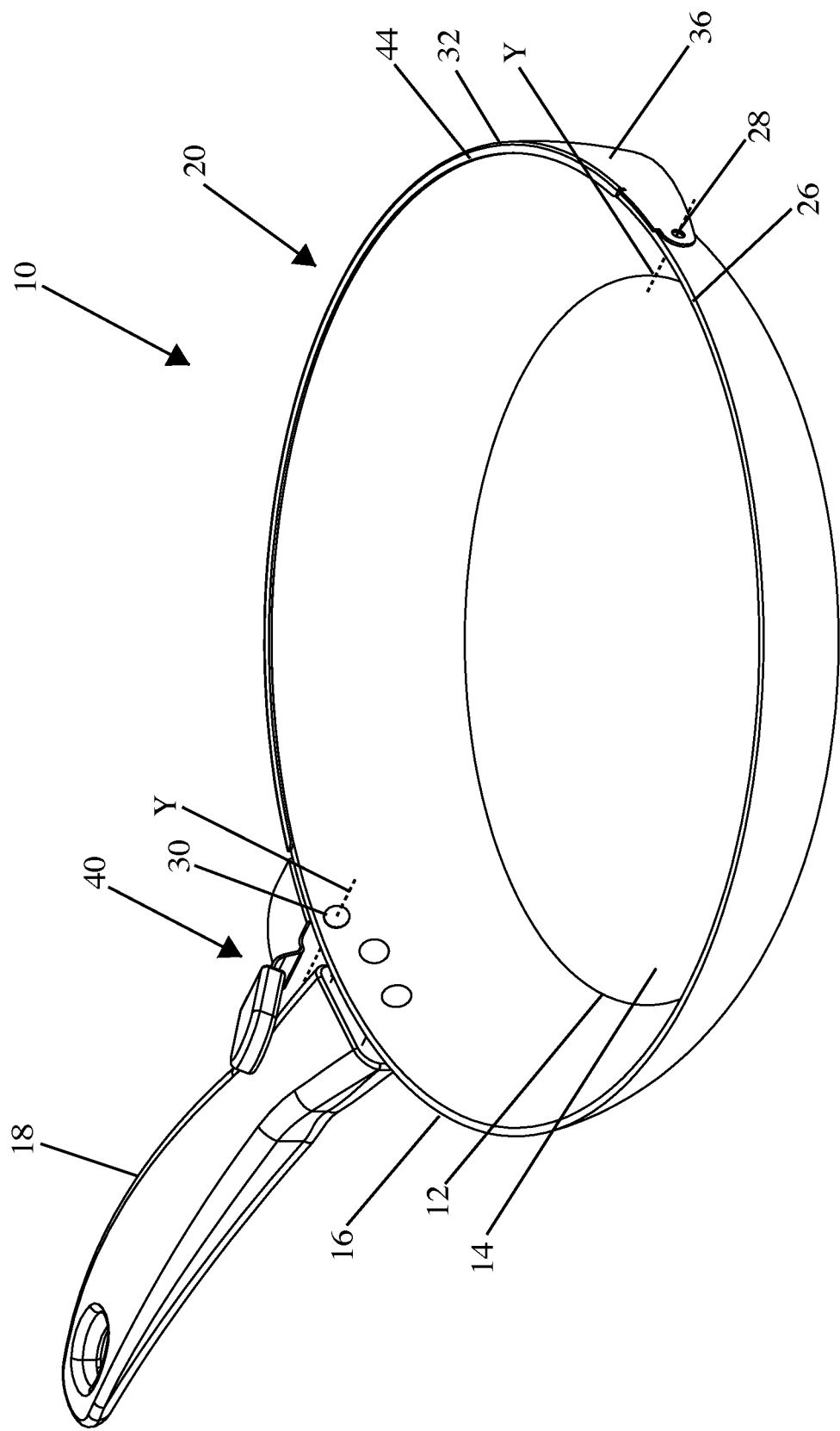
FIG. 2 is rear, side perspective view of the version shown in FIG. 1.

With reference to the figures, particularly FIG. 1 and FIG. 2 thereof, therein illustrated is a pivoting strainer attached to a pan according to a first embodiment of the present invention. FIG. 1 is an illustrative interior perspective view showing the cooking pan 10 in a closed configuration. The example cooking pan 10 generally comprises a substantially flat and circular base 12 having a cooking surface 14, a peripheral wall 16 upstanding from said circular base 12, a pan handle 18 extending outwardly from the peripheral wall 16 and a pivoting strainer 20 moveable between a closed position and a raised, draining position. The pan or cooking apparatus can vary in size, dimension and shapes.

In reference to the cooking pan 10, the circular base 12 and cooking surface 14 are conventional in nature. Ideally, the cooking surface 14 is generally flat and configured to cook and transfer heat to food as customary known in the culinary art. The base 12 may be flat or curved, and the peripheral wall 16 may extend either vertically (perpendicular to the base) or slightly outward as well—either linearly or arcuately. The circular base 12 and peripheral wall 16 are imperforate and cooperate to define an open—top container for holding the food to be cooked, including any liquid associated therewith.

In particular, the cooking pan 10 peripheral wall 16 comprises an interior surface 22 and an exterior surface 24. Generally speaking, the peripheral wall 16 has a curved cross section (see FIG. 5-FIG. 7), showing the peripheral wall 16 extending outward and upward from the base 12 terminating with an upper curved rim 26. Alternatively, it will be known that the peripheral wall 16 upstanding from the base 12 may have a linear cross section as opposed to a curved cross section. For example, the peripheral wall 16 would have a linear cross section extending at an angle from and radially about the base 12.

Figure 16:
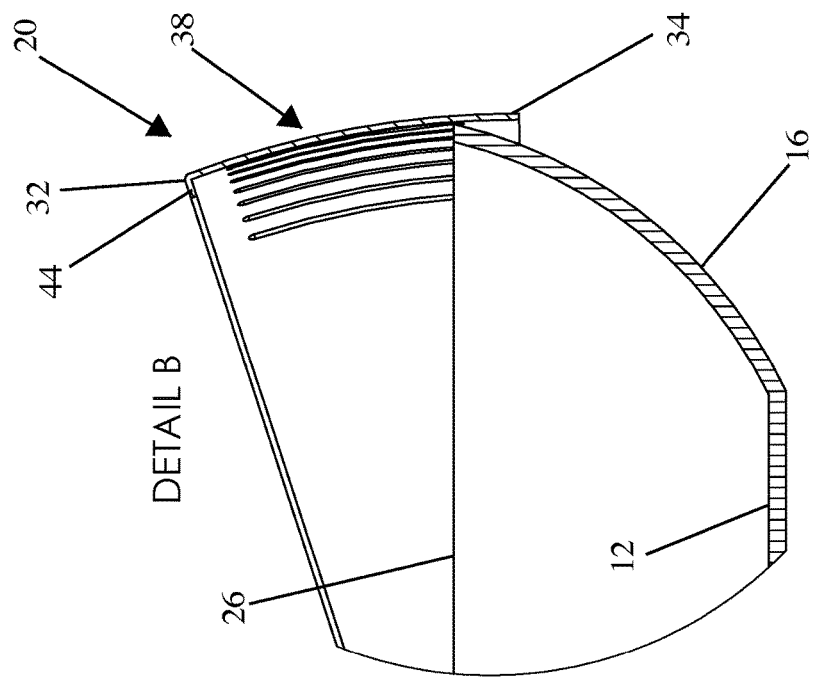
FIG. 16 is an up-close detailed view of the pivoting strainer while in the draining position taken at B of FIG. 6.
Figure 14:
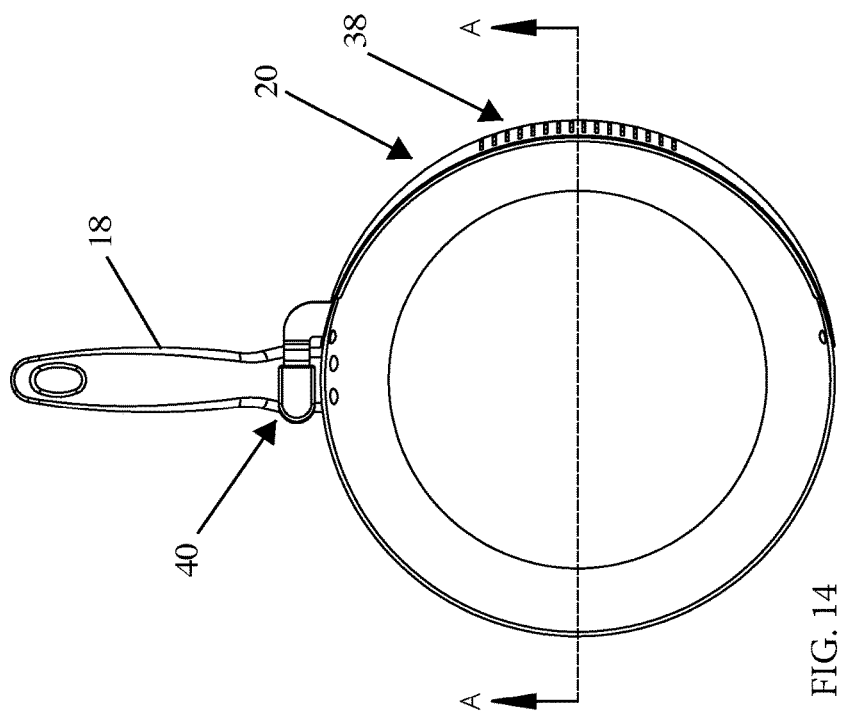
FIG. 14 is a top plan of the version shown in FIG. 1 while pivoting strainer is in the draining position.
Figure 15:
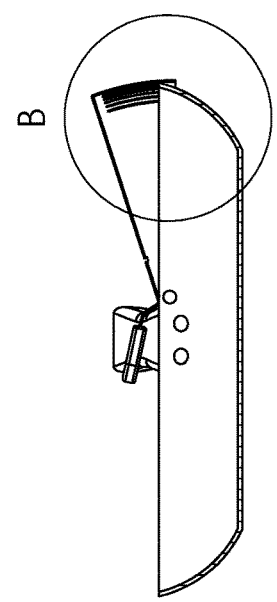
FIG. 15 is a cross sectional view taken along lines A-A of FIG. 14.
Figure 17:
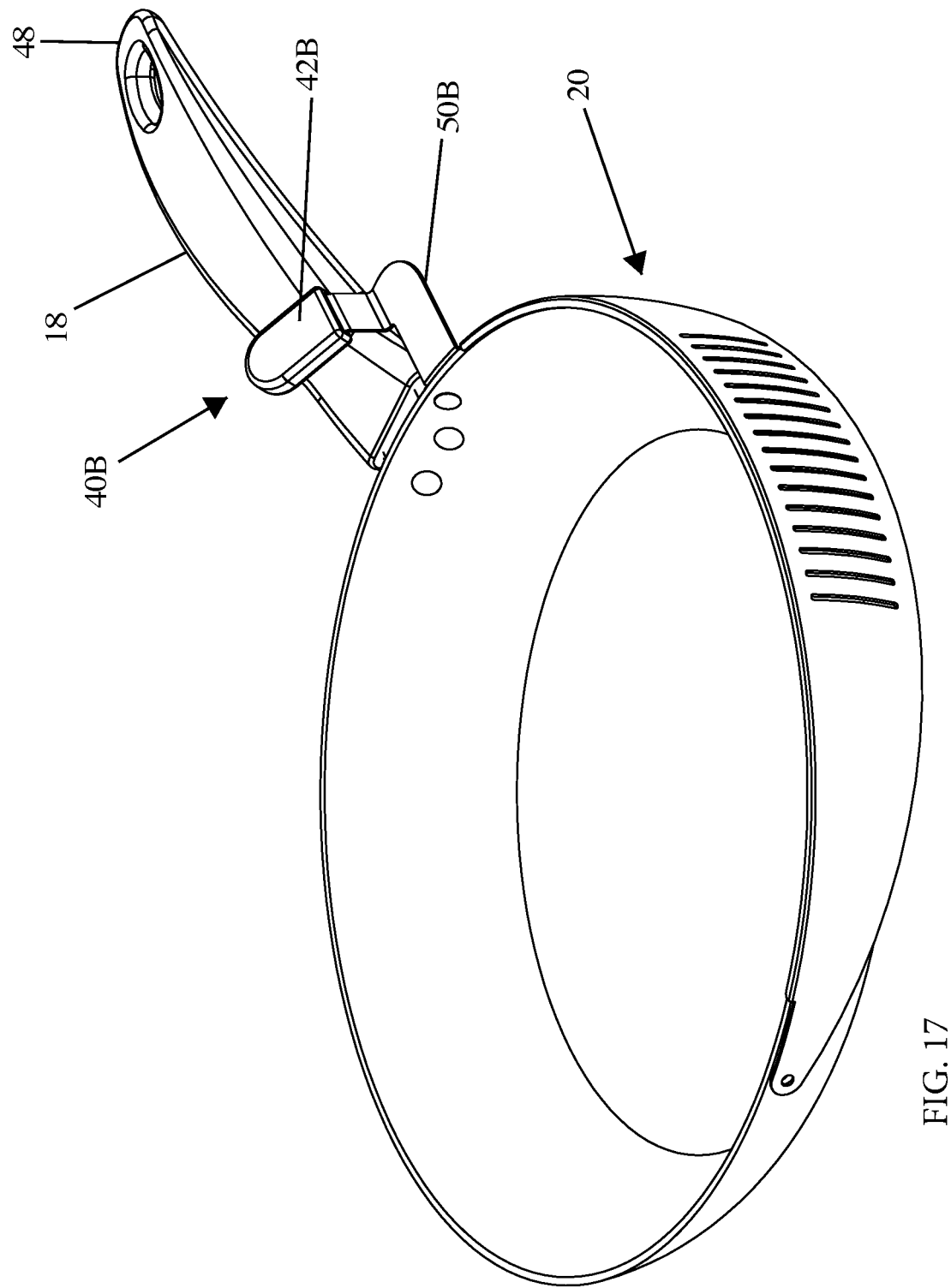
FIG. 17 is a front, side perspective view of a version showing an extended lever while the pivoting strainer is in the closed position.
Figure 18:
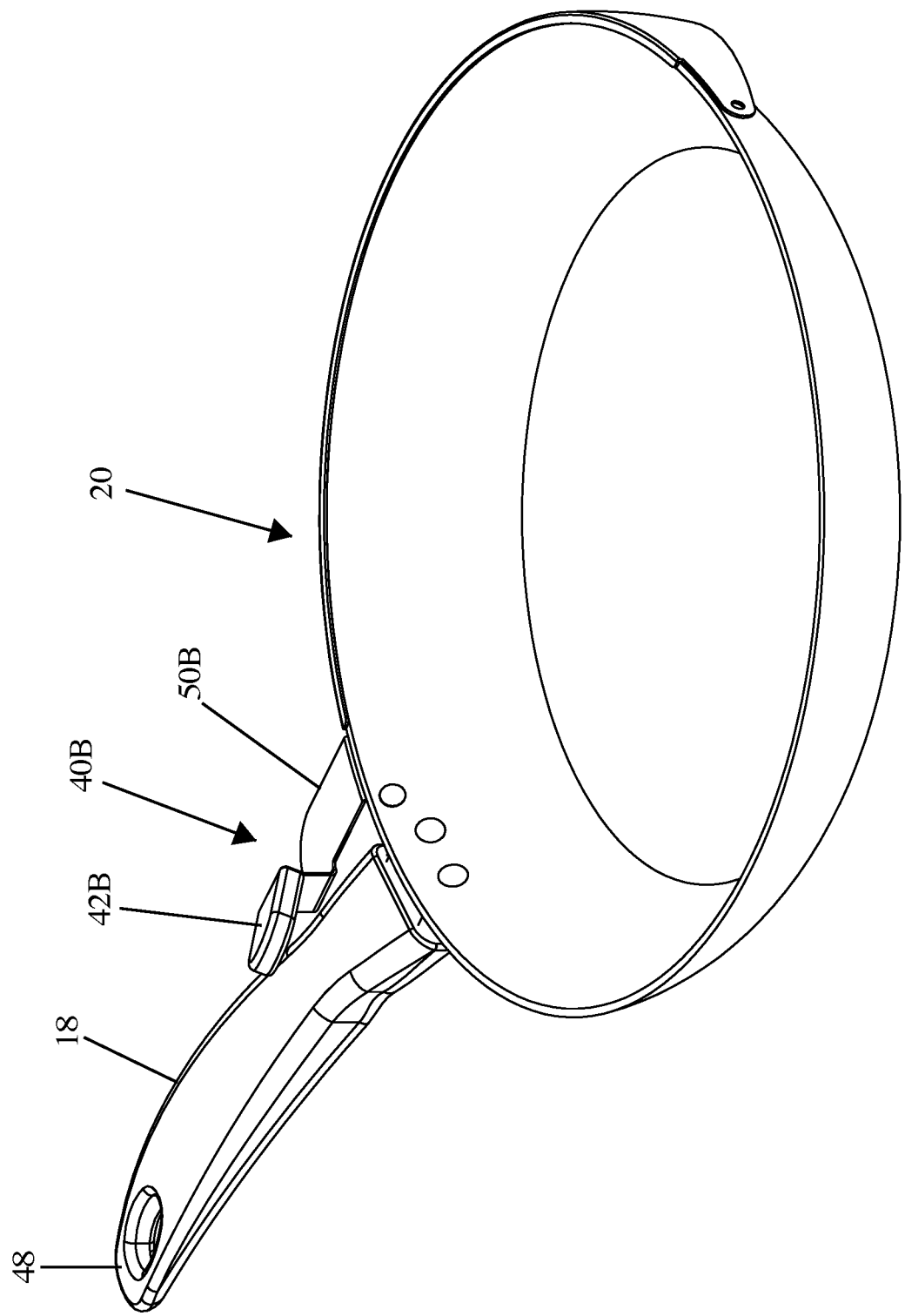
FIG. 18 is a rear, side perspective view of the version shown in FIG. 17.
Figure 19:
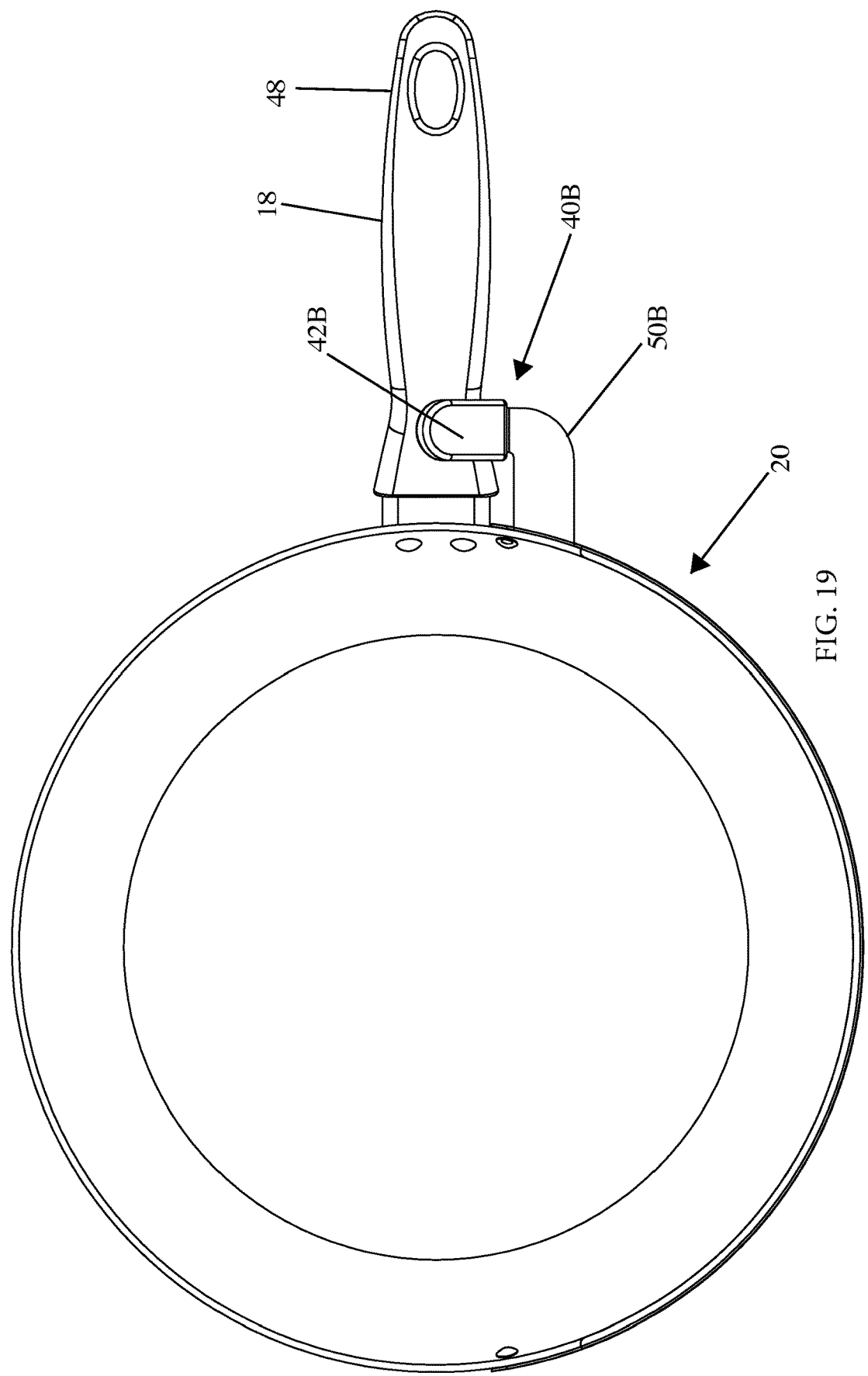
FIG. 19 is a top plan view of the version shown in FIG. 17.
Figure 20:
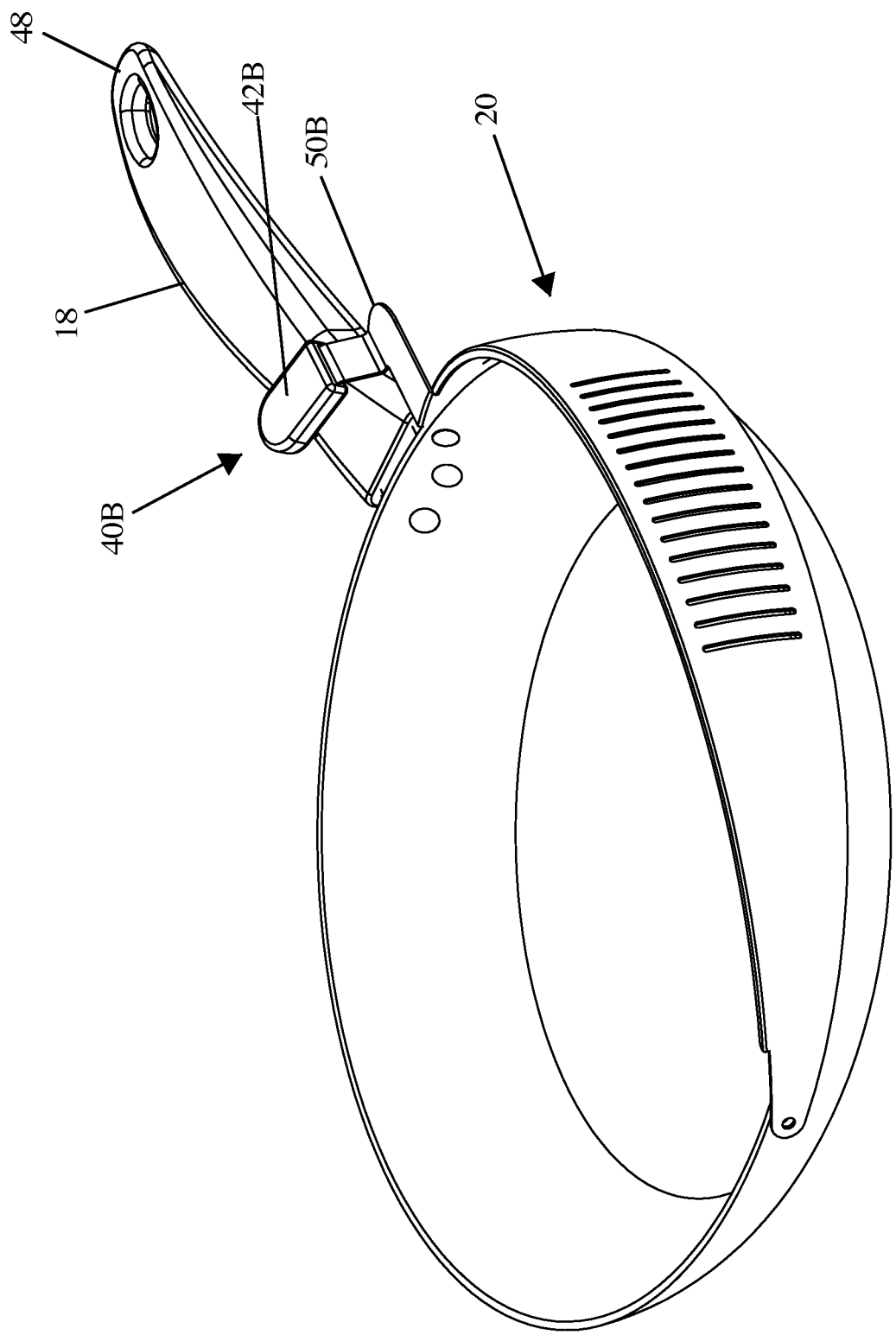
FIG. 20 is a front, side perspective view of the version shown in FIG. 17 showing the pivoting strainer in the draining position.
Figure 21:
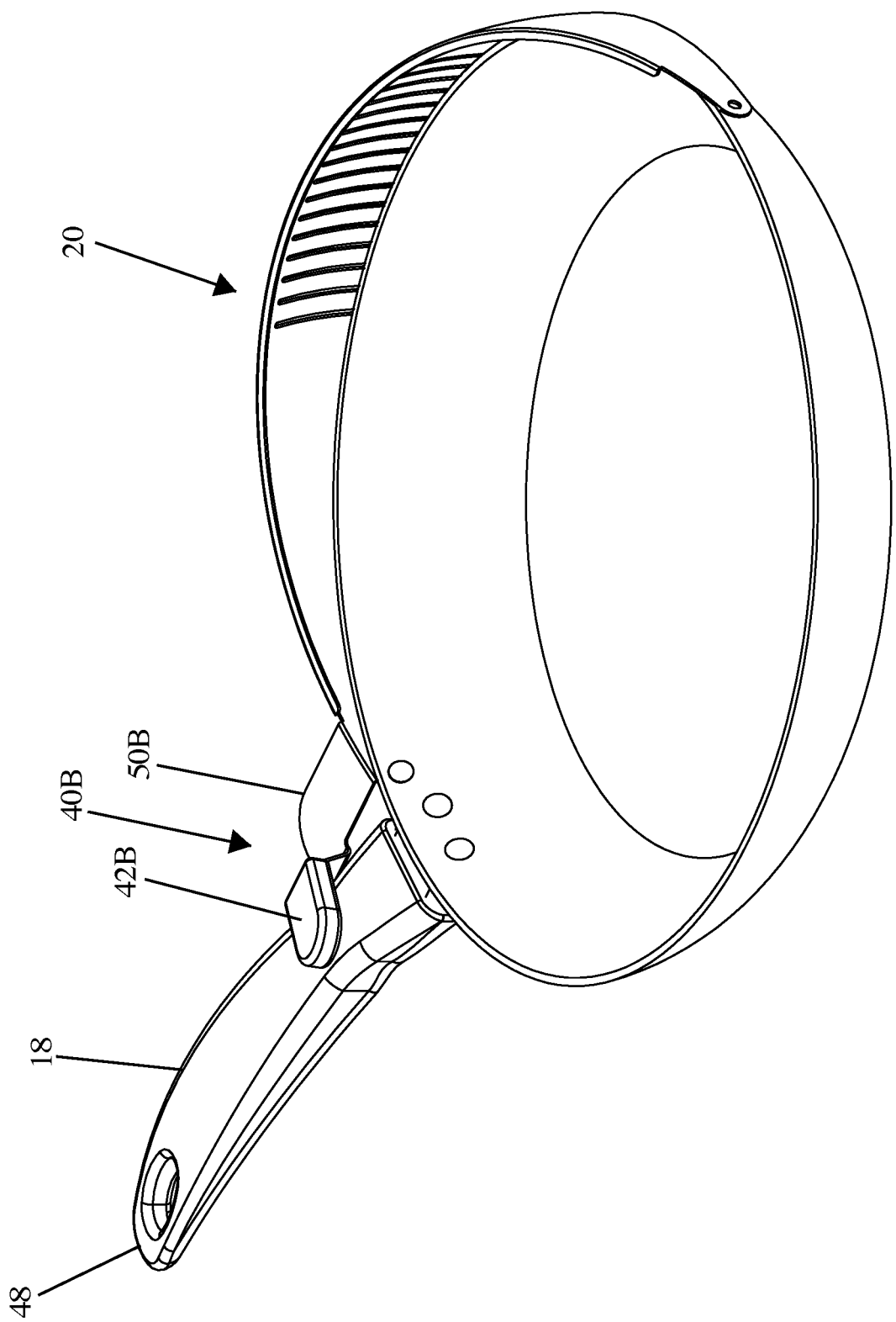
FIG. 21 is a rear, side perspective view of the version shown in FIG. 17 showing the pivoting strainer in the draining position.
Figure 22:
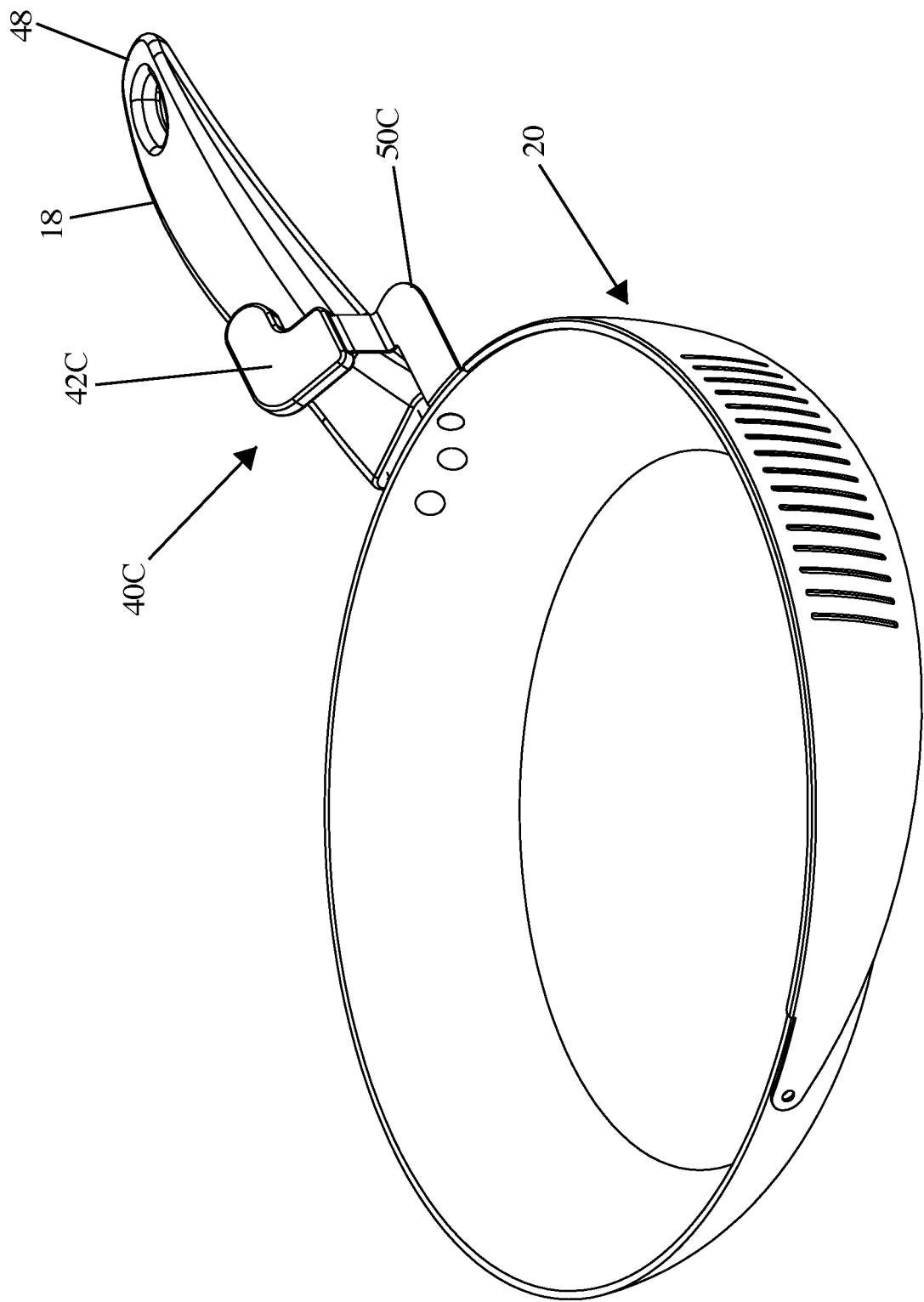
FIG. 22 is a front, side perspective view of a version showing a third version of the lever while the pivoting strainer is in the closed position.
Figure 23:
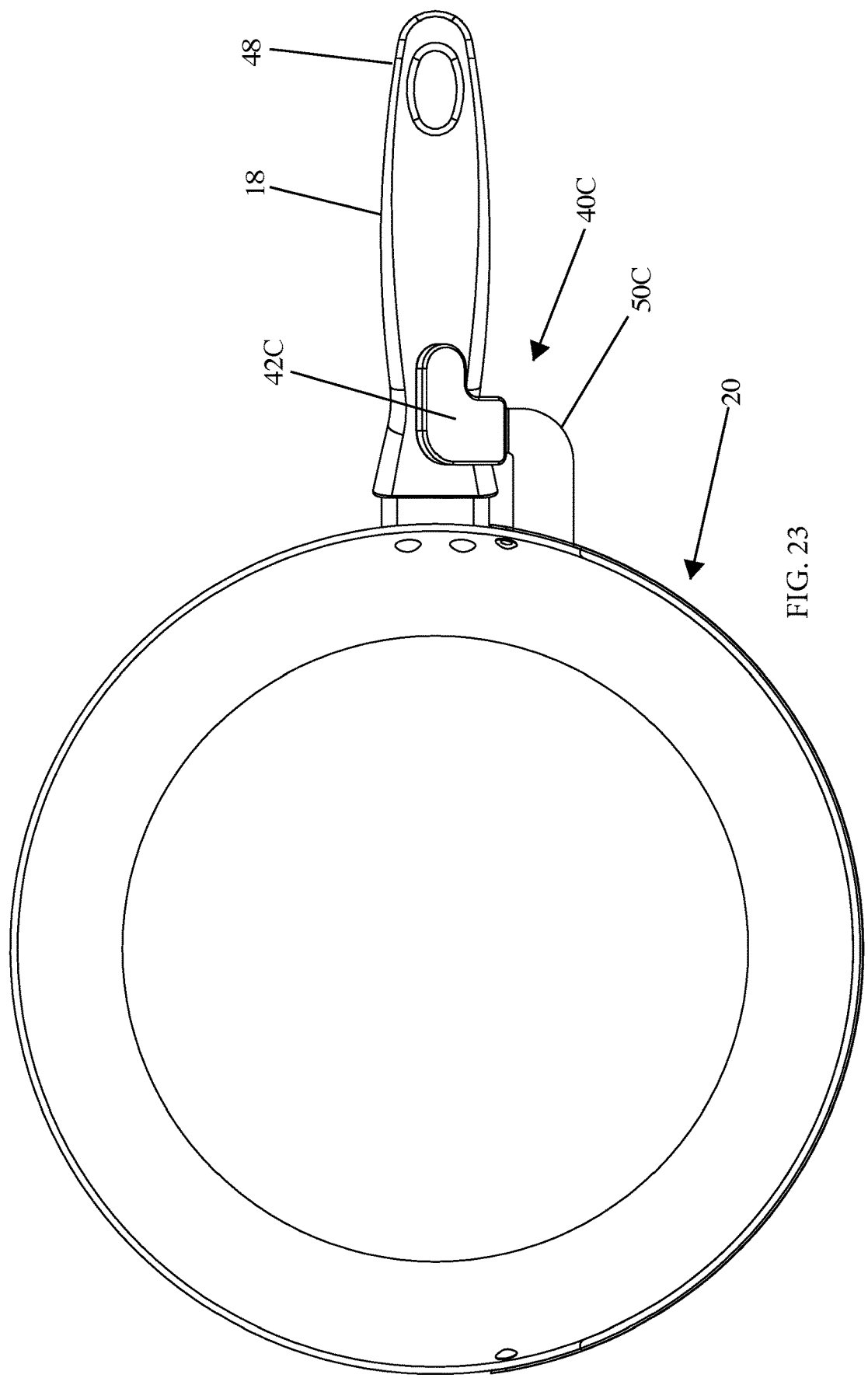
FIG. 23 is a top plan view of the version shown in FIG. 22.
Figure 24:
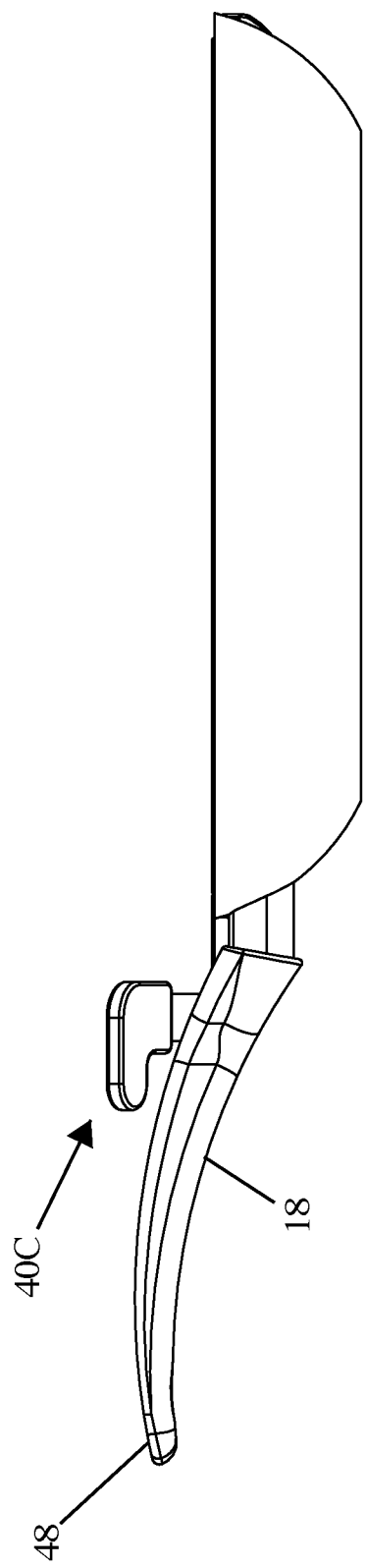
FIG. 24 is a rear elevation view of the version shown in FIG. 22.
Figure 25:
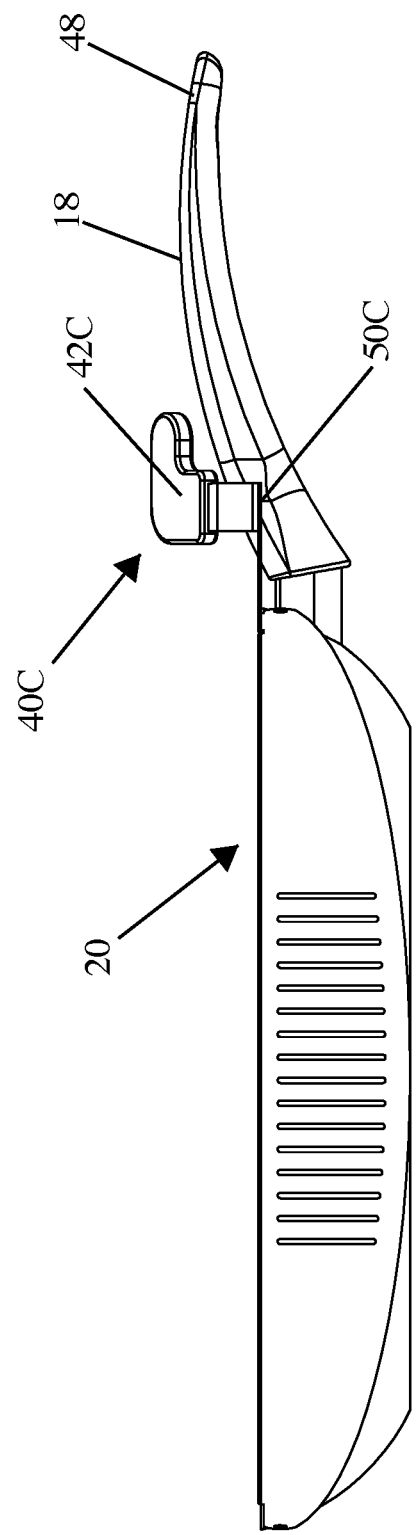
FIG. 25 is a front elevation view of the version shown in FIG. 22.
Figure 26:
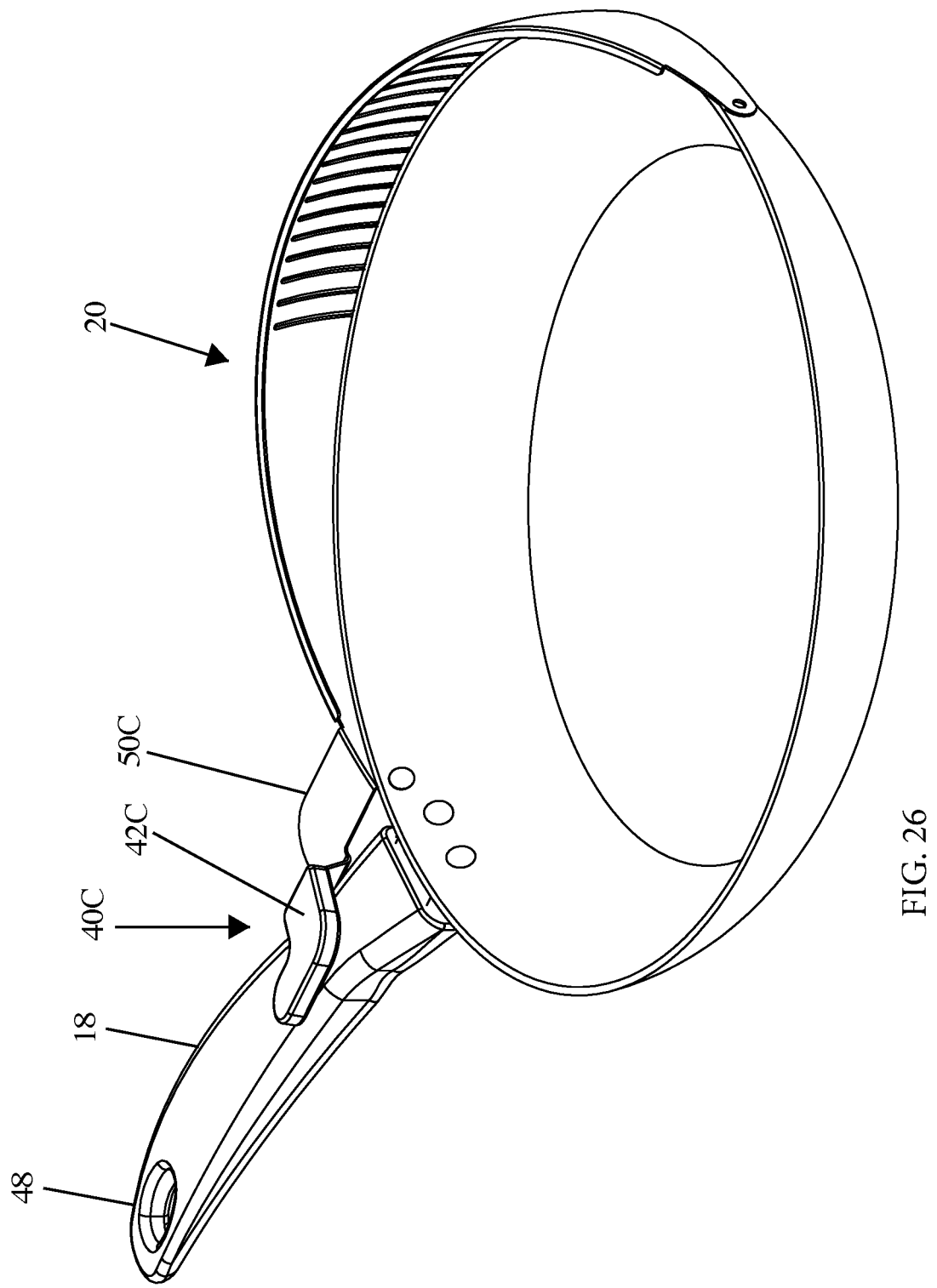
FIG. 26 is a rear, side perspective view of the version shown in FIG. 22 showing the pivoting strainer in the draining position.
Figure 27:
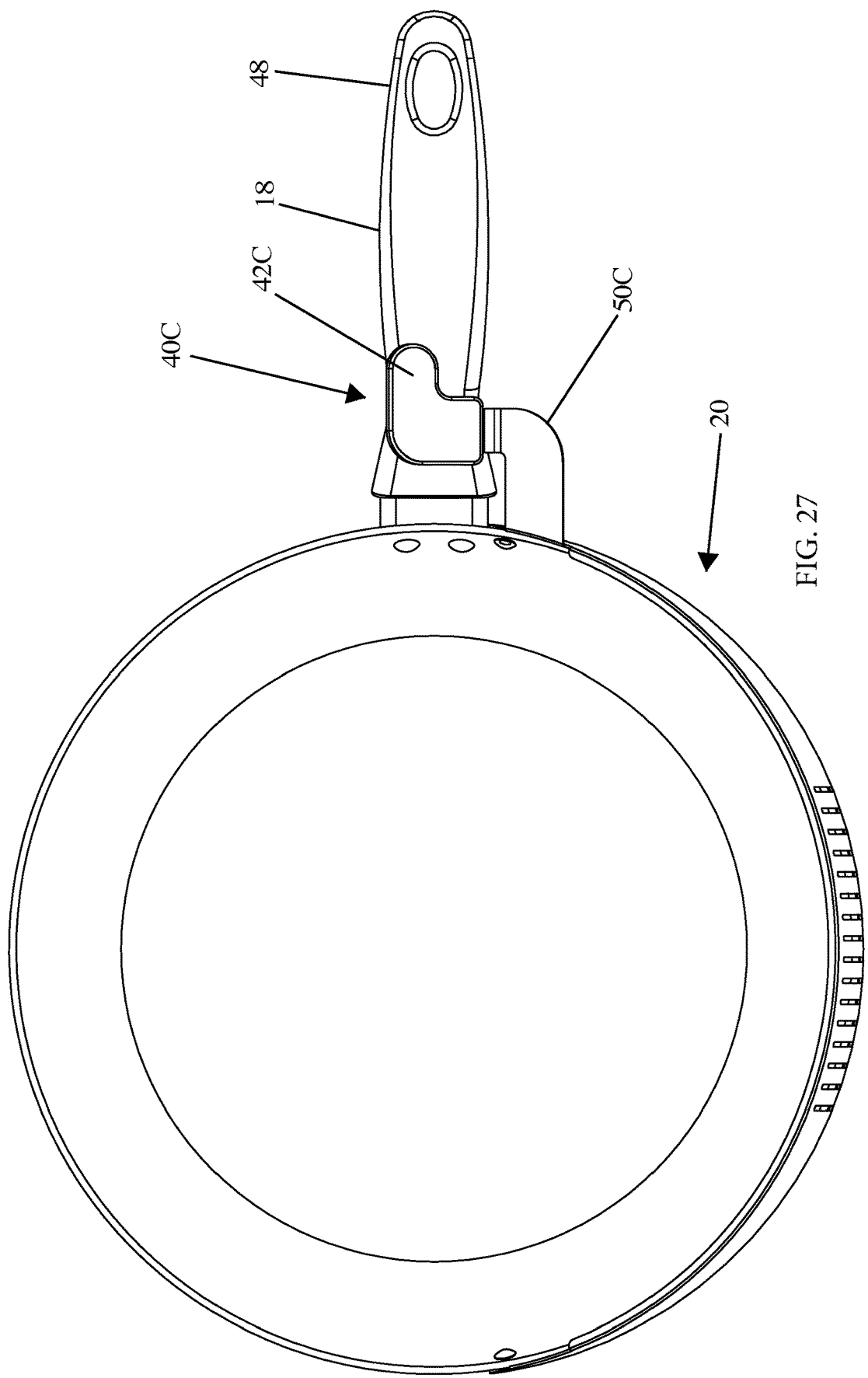
FIG. 27 is a top plan view of the version shown in FIG. 22 showing the pivoting strainer in the draining position.
Figure 28:
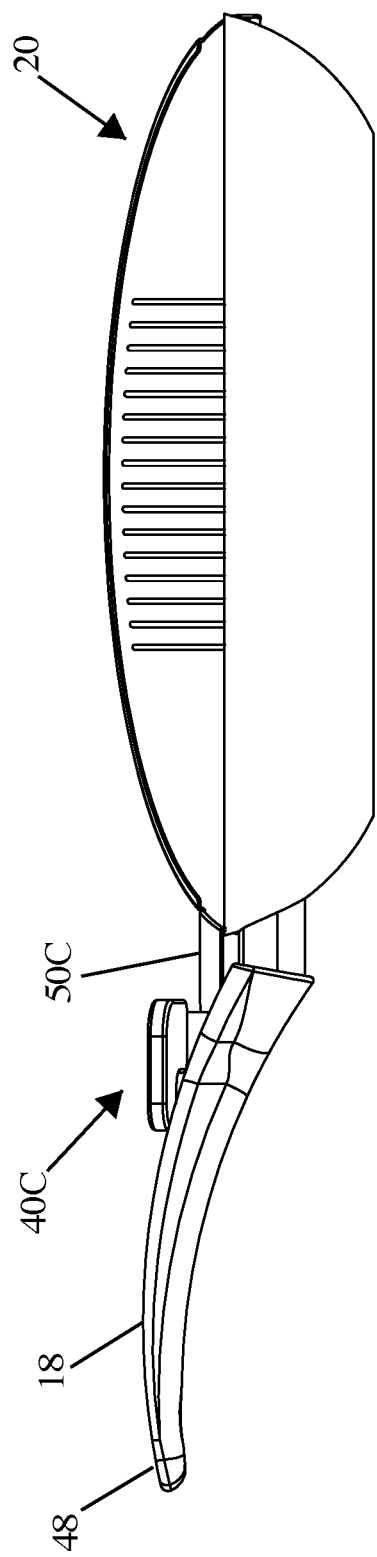
FIG. 28 is a rear elevation view of the version shown in FIG. 22 showing the pivoting strainer in the draining position.
Figure 29:
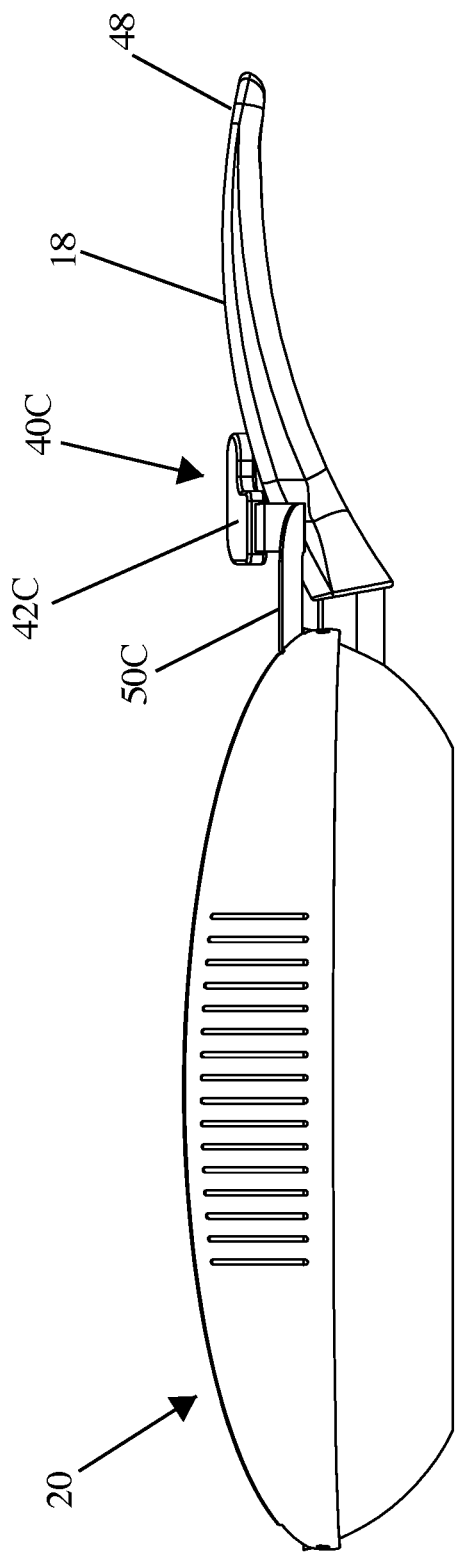
FIG. 29 is a front elevation view of the version shown in FIG. 22 showing the pivoting strainer in the draining position.
Figure 30:
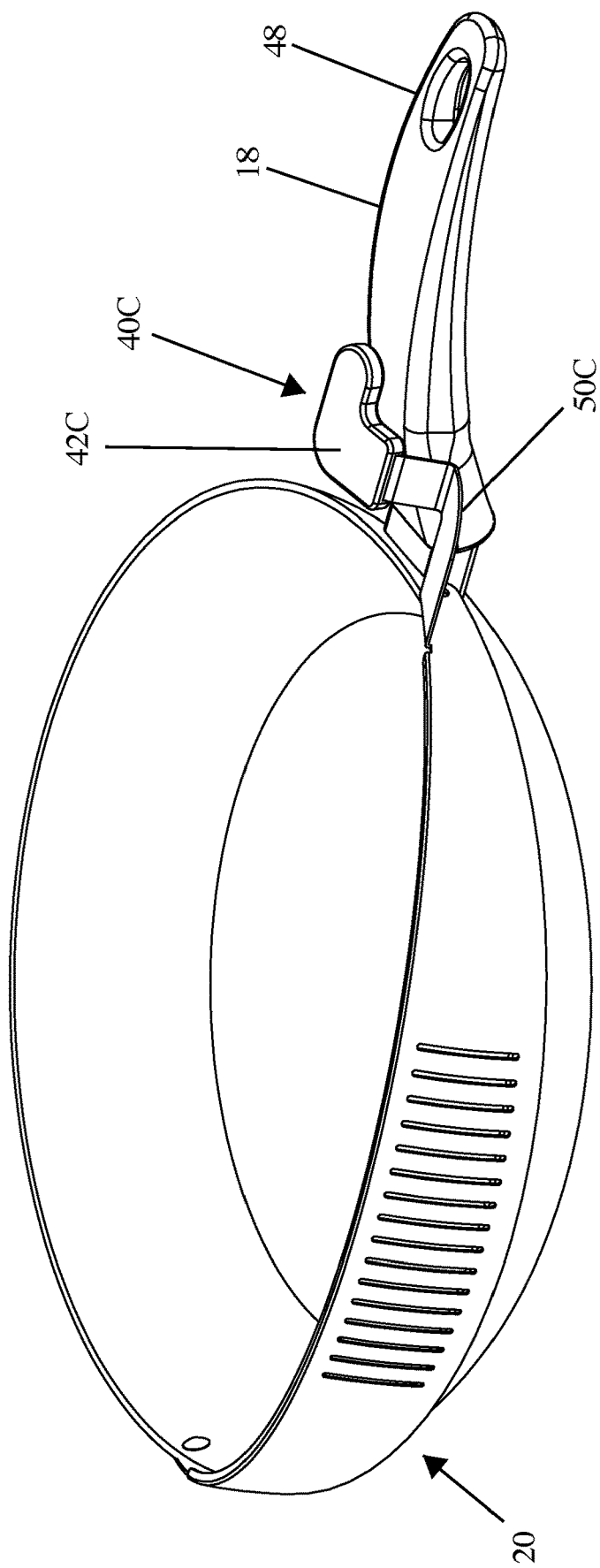
FIG. 30 is a front, side perspective view of the version shown in FIG. 22 showing the pivoting strainer in the draining position.

The pivoting strainer 20 generally comprises a curved structure or surface 36 with is generally concentric with that of the pan 10 and in particular, the upper curved rim 26. However, other countered shapes can be contemplated as alternative versions in order to operably associate with the upper curved rim 26. The pivoting strainer 20 further comprises an upper perimeter 32 terminating at a lip 44, a lower terminating perimeter 34, and a plurality of drainage perforations 38 embedded within the curved surface 36. The pivoting strainer 20 is pivotally attached to the peripheral wall 16 at opposed first and second hinge contact points 28 and 30 forming an axis of rotation Y (FIG. 5). In particular, the first and second hinged contact points 28 and 30 allow the pivoting strainer 20 to move between a closed position (see FIG. 1) and a raised, draining position (see FIG. 8) about pivot axis Y. As best illustrated by FIG. 16, while in the draining position, the pivoting strainer 20 extends above a segment of the peripheral wall 16 and upper curved rim 26 exposing the perforations to the interior contents of the pan 10, thereby enabling the passage of liquid from the interior of the pan to the exterior of the pan. While in the closed position, the pivoting strainer 20 is generally positioned such that it does not interfere with the conventional configuration of the cooking pan and cooking surfaces (see FIG. 3 and FIG. 7). The hinged contact points 28, 30 can be constructed with permanent rivets or removable fasteners as known in the art. The pivoting strainer 20 can be configured to be attachably removable at the hinged contact points 28, 30—attachable to fit various sized pots or pans. Thus, the pivoting strainer 20 can be removed from a first pan having a first size and attached to a second pan having a second size.

In a preferred configuration, the upper perimeter 32 terminating at a lip 44 is generally concentric in shape to the upper curved rim 26 of the pan, wherein while in the lowered, closed position the lip 44 overlaps the upper curved rim 26 of the peripheral wall 16, thereby preventing the pivoting strainer 20 from rotating downward about the first and second hinged contact points 28, 30 and providing a seal between the peripheral wall 16 and the pivoting strainer 20. In the version, and as best illustrated by FIG. 1 and FIG. 7, the lip 44 concentrically extends flush with the upper curved rim 26 while in the closed position, not intruding into the cooking area.

Similarly, in the preferred version and as shown best in FIG. 16, the lower terminating perimeter 34 is generally concentric in shape to the upper curved rim 26 of the cooking pan 10. Thus, while in the raised, draining position the lower terminating perimeter 34 couples with the upper curved rim 26 by an interference type fit or by friction, thereby preventing the pivoting strainer 20 from moving upward and providing a seal between the pan 10 and the pivoting strainer 20 during the straining process.

The plurality of drainage perforations 38 are embedded within the curved surface 36 of the pivoting strainer 20 in order to allow the passage of liquid from the interior of the cooking pan 10 to the exterior of the pan while the pivoting strainer 20 is in the raised, draining position. The drainage perforations 38 are configured and dimensioned to substantially block the passage of solid food therethrough. In the version, the drainage perforations 38 are a plurality of aligned elongated slits extending upward and vertically within the curvature of the curved surface 36.

Figure 12:
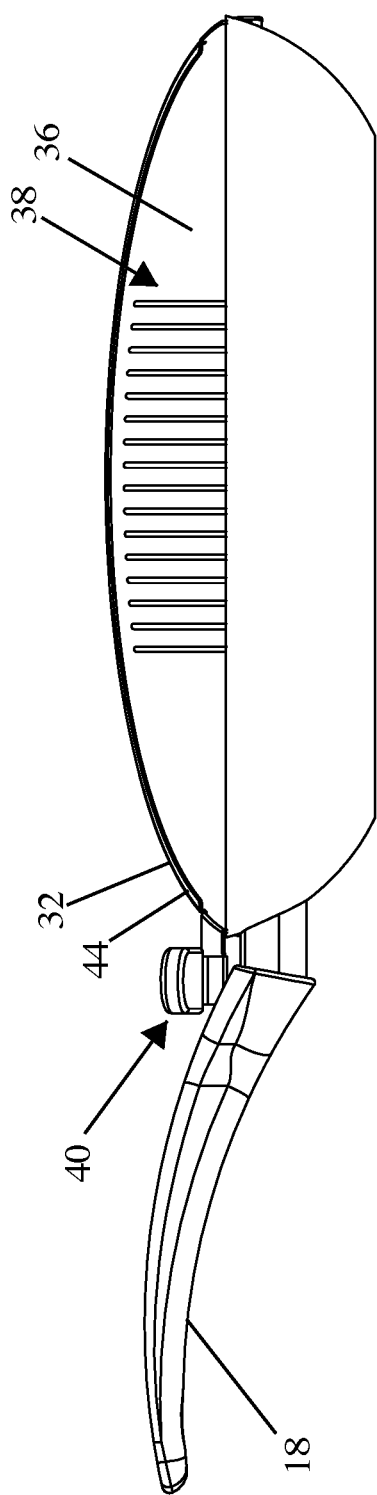
FIG. 12 is a rear side elevation view of the version shown in FIG. 1 showing the pivoting strainer in the draining position.
Figure 13:
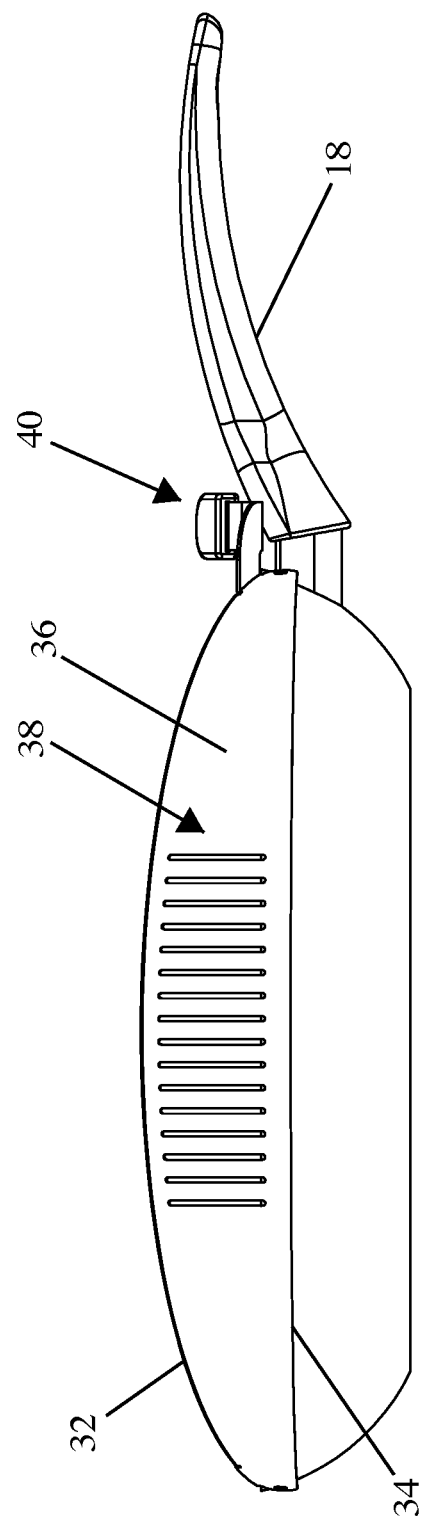
FIG. 13 is a front side elevation view of the version shown in FIG. 1 showing the pivoting strainer in the draining position.

The pan handle 18 is a supportive member that is sufficiently constructed in order to manipulate and pick up the pan as customarily known in the art. In the version and as best illustrated by FIG. 12 and FIG. 13, the pan handle 18 having axis of rotation C (FIG. 5) extends and curves upwardly and outwardly from the peripheral wall 16 generally parallel to the rotating axis of the pivoting strainer and parallel to the outwardly facing plurality of drainage perforations 38 of the pivoting strainer 20. The position of the handle 18 generally places the drainage perforations facing radially outward from the rotational axis C of the user's wrist.

Figure 8:
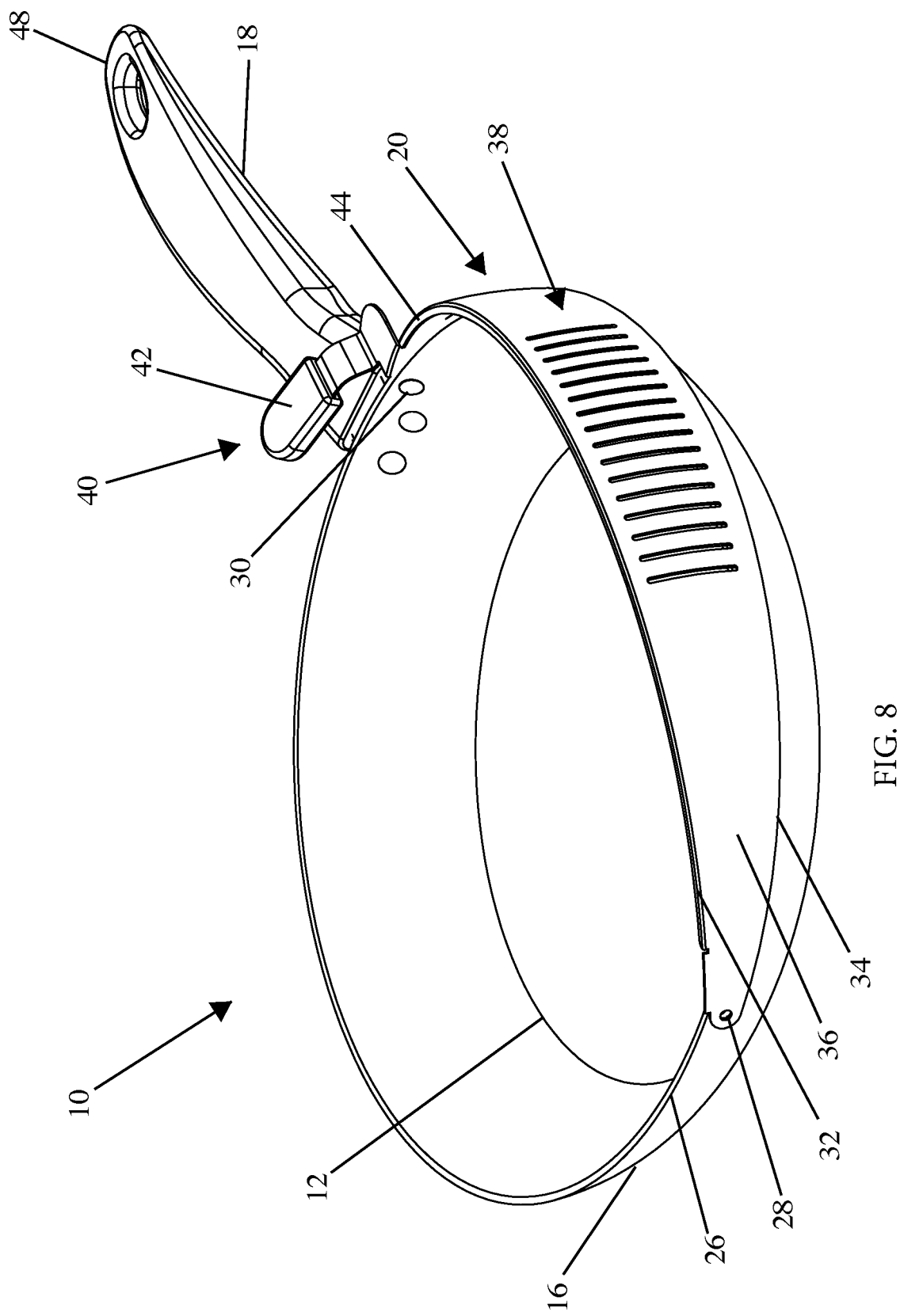
FIG. 8 is a front, side perspective view of the version shown in FIG. 1 showing the pivoting strainer in the draining position.
Figure 9:
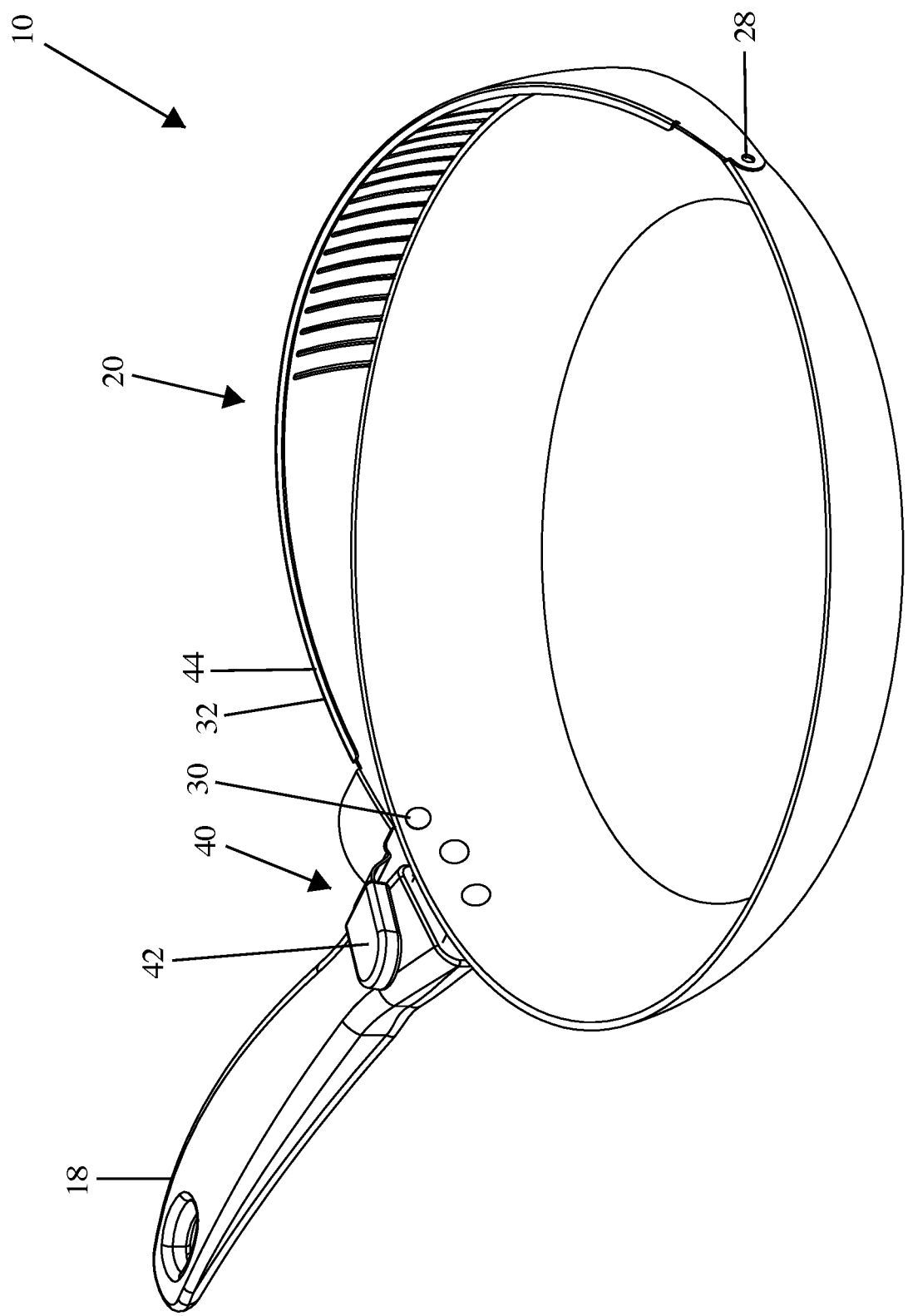
FIG. 9 is a rear, side perspective view of the version shown in FIG. 1 showing the pivoting strainer in the draining position.

As best introduced by FIG. 8, the version 10 further comprises a thumb actuated opening lever 40 or a means for moving the pivoting strainer 20 relative to the upper curved rim 26 from the closed position to the draining position. In particular, the opening lever 40 provides the user with the ability to push down with their thumb while simultaneously holding the pan handle 18 in order to move the pivoting strainer 20 into the raised, draining position during operation. In the version, the opening lever 40 is attached near the upper perimeter 32 or lip 44 of the pivoting strainer 20 near and preceding the hinged contact point 30 and the Y pivot axis of rotation. The opening lever 40 extends outside of the pan 10 interior and adjacent the peripheral wall 16—extending over the Y pivot axis and above the pan handle 18 near the position of the user's thumb. Thereby, as the opening lever 40 is depressed by the user's thumb while holding the handle 18, the pivoting strainer pivots about the pivot axis Y moving from the closed position to the draining position.

The opening lever 40 includes a generally flat engagement surface 42 which is suspended overtop of the base 46 of the pan handle 18. Thus, the configuration and position of the opening lever 40 provides the user with the ability to apply a downward force and movement via thumb to the opening lever 40 via the engagement surface 42 generating a rotational action about pivot axis Y moving the pivoting strainer 20 upward and into the raised, draining position during operation.

As illustrated by FIG. 17-FIG. 21, a second version of the means for moving the pivoting strainer or lever is illustrated designated as numeral 40B with all other parts and elements generally the same as previously described and designated as such. The lever 40B is configured to generally extend further towards the end 48 of the pan hand 18 from the pivoting strainer 20 via support member 50B. This positions the engagement surface 42B in close proximity to the user's thumb while the pivoting strainer 20 is not engaged. Moreover, it positions the engagement member 42B at a similar altitude of where the user's thumb would be positioned on the upwardly and outwardly extending pan handle 18.

In yet another version as best illustrated by FIG. 22-FIG. 32, a third version of the means for moving the pivoting strainer is illustrated and designated as number 40C with all parts and elements generally the same as previously described and designated as such. Similar to lever 40B, the alternative 40C extends towards the end 48 of the pan handle 18 from the pivoting strainer 20 via support member 50C as well as provides an extension of the engagement surface 42C thereof proximate the user's thumb.

The cooking pan 10 can be made in any manner and of any material chosen with sound engineering judgment. Preferably, materials will be strong, lightweight, long lasting, economic, and ergonomic. Construction of the cooking pan 10 can be made of any known material known in the culinary art such as plastics, cast iron, aluminum, or stainless steel or a combination thereof.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings may be replaced by alternative features serving the same, equivalent or similar purpose unless expressly stated otherwise.

What is claimed:

1. A pivoting strainer configured to operably attach to a container for straining grease and other liquid components away from solid food, the container having a cooking surface, a peripheral wall upstanding from a base terminating with an upper curved rim, and a handle extending outwardly from the peripheral wall, the pivoting strainer comprising:
   a body having perforations pivotally attachable to the peripheral wall of the container and moveable about a pivot axis relative to the peripheral wall and the upper curved rim between i) a draining position wherein the pivoting strainer is positioned exterior of the peripheral wall and extends above the peripheral wall and the upper curved rim exposing the perforations to interior contents of the container, thereby enabling the movement of liquid from an interior of the container to the exterior of the container, and ii) a closed position wherein the pivoting strainer is positioned exterior of the peripheral wall such that the pivoting strainer does not interfere with the cooking surface; and an opening lever operably attached to the pivoting strainer which is rotatable about the pivot axis and extends above the handle, wherein as the lever is pushed down at an engagement surface above the handle, the pivoting strainer pivots about the pivot axis moving the pivoting strainer upward from the closed position to the draining position;

wherein the pivot axis of the pivoting strainer is operably positioned away from the handle by the opening lever.

2. The pivoting strainer of claim 1, wherein the drainage perforations are configured and dimensioned to block the passage of solid food therethrough.

3. The pivoting strainer of claim 2, wherein the drainage perforations are a plurality of aligned elongated slits extending upward within the pivoting strainer.

4. The pivoting strainer of claim 1, wherein the pivoting strainer further comprises a lower terminating perimeter which is concentric to the upper curved rim of the container, wherein while in draining position the lower terminating perimeter couples with the upper curved rim by an interference type fit, thereby preventing the pivoting strainer from moving upward and providing a seal between the container and the pivoting strainer during a straining process.

5. The pivoting strainer of claim 1, wherein the pivoting strainer further comprises an upper perimeter terminating at a lip which is concentric to the upper curved rim of the container, wherein while in the closed position the lip overlaps the upper curved rim, thereby preventing the pivoting strainer from moving downward and providing a seal between the container and the pivoting strainer.

6. The pivoting strainer of claim 1, wherein the pivoting strainer is attachably removable from the food container.

7. A pivoting strainer operably attachably removable to a pan for straining grease and other liquid components away from solid food, the pan having a cooking surface, a peripheral wall upstanding from a base terminating with an upper curved rim, and a handle extending outwardly from the peripheral wall, the pivoting strainer comprising:

a body having perforations pivotally attachable to the peripheral wall of the pan and moveable about a pivot axis relative to the peripheral wall and the upper curved rim between i) a draining position wherein the pivoting strainer is positioned exterior of the peripheral wall and extends above the peripheral wall and the upper curved rim exposing the perforations to the interior contents of the pan, thereby enabling the passage of liquid from the interior of the pan to the exterior of the pan, and ii) a closed position wherein the pivoting strainer is positioned exterior of the peripheral wall such that the pivoting strainer does not interfere with the configuration of the pan and cooking surface; the pivoting strainer comprising a lower terminating perimeter which is concentric to the upper curved rim of the pan, wherein while in draining position the lower terminating perimeter couples with the upper curved rim by an interference type fit, thereby preventing the pivoting strainer from moving upward and providing a seal between the pan and the pivoting strainer during a straining process; and an upper perimeter terminating at a lip which is concentric to the upper curved rim of the pan, wherein while in the closed position the lip overlaps the upper curved rim, thereby preventing the pivoting strainer from moving downward and providing the seal between the pan and the pivoting strainer; and an opening lever operably attached to the pivoting strainer which is rotatable about the pivot axis and extends above the handle, wherein as the lever is pushed down at an engagement surface above the handle, the pivoting strainer pivots about the pivot axis moving the pivoting strainer upward from the closed position to the draining position;

wherein the pivot axis of the pivoting strainer is positioned away from handle by the opening lever.

8. A cooking pan for straining grease and other liquid components away from solid food, comprising:

a cooking surface;

a peripheral wall upstanding from a base terminating with an upper curved rim;

a handle extending outwardly from the peripheral wall;

a pivoting strainer comprising:

a body defining perforations pivotally attached to the peripheral wall and moveable about a pivot axis relative to the peripheral wall and the upper curved rim between i) a draining position wherein the pivoting strainer is positioned exterior of the peripheral wall and extends above the peripheral wall and the upper curved rim exposing the perforations to the interior contents of the cooking pan, thereby enabling the passage of liquid from an interior of the container to the exterior of the pan, and ii) a closed position wherein the pivoting strainer is positioned exterior of the peripheral wall; and an opening lever operably attached to the pivoting strainer which is rotatable about the pivot axis and extends above the handle, wherein as the lever is pushed down at an engagement surface above the handle, the pivoting strainer pivots about the pivot axis moving the pivoting strainer upward from the closed position to the draining position;

wherein the pivot axis of the pivoting strainer operably is positioned away from the handle by the opening lever.

9. The cooking pan of claim 8, wherein the perforations are configured and dimensioned to block the movement of solid food therethrough.

10. The cooking pan of claim 9, wherein the perforations are a plurality of aligned elongated slits extending upward within a curved surface of the pivoting strainer.

11. The cooking pan of claim 8, wherein the pivoting strainer further comprises a lower terminating perimeter which is concentric to the upper curved rim of the cooking pan, wherein while in draining position the lower terminating perimeter couples with the upper curved rim by an interference type fit, thereby preventing the pivoting strainer from moving upward and providing a seal between the pan and the pivoting strainer during a straining process.

12. The cooking pan of claim 8, wherein the pivoting strainer further comprises an upper perimeter terminating at a lip which is concentric to the upper curved rim of the cooking pan, wherein while in the closed position the lip overlaps the upper curved rim, thereby preventing the pivoting strainer from moving downward and providing a seal between the pan and the pivoting strainer.

\* \* \* \* \*